US011915560B2

(12) United States Patent
Nicely

(10) Patent No.: US 11,915,560 B2
(45) **Date of Patent: *Feb. 27, 2024**

(54) GAMING SYSTEM AND METHOD FOR PROVIDING A CASCADING SYMBOL GAME WITH MULTIPLE SYMBOL DISPLAY POSITION ELEMENTS

(71) Applicant: IGT, Las Vegas, NV (US)

(72) Inventor: Mark C. Nicely, Daly City, CA (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/078,851

(22) Filed: Dec. 9, 2022

(65) Prior Publication Data

US 2023/0104811 A1 Apr. 6, 2023

Related U.S. Application Data

(63) Continuation of application No. 17/078,362, filed on Oct. 23, 2020, now Pat. No. 11,562,630, which is a continuation of application No. 16/045,160, filed on Jul. 25, 2018, now abandoned, which is a continuation of application No. 15/052,532, filed on Feb. 24, 2016, now Pat. No. 10,055,944, which is a continuation of application No. 14/028,896, filed on Sep. 17, 2013, now Pat. No. 9,275,524.

(51) Int. Cl.
*G07F 17/34* (2006.01)
*G07F 17/32* (2006.01)

(52) U.S. Cl.
CPC .......... *G07F 17/34* (2013.01); *G07F 17/3213* (2013.01); *G07F 17/3244* (2013.01)

(58) Field of Classification Search
CPC ........................... G07F 17/326; G07F 17/3267
See application file for complete search history.

(56) References Cited

U.S. PATENT DOCUMENTS 4,099,722 A 7/1978 Rodesch et al.
4,200,291 A 4/1980 Hooker
4,357,567 A 11/1982 Rock
4,636,951 A 1/1987 Harlick
4,695,053 A 9/1987 Vazquez et al.
4,790,537 A 12/1988 Smyth et al.
4,826,169 A 5/1989 Bessho et al.
4,874,173 A 10/1989 Kishishita
(Continued)

FOREIGN PATENT DOCUMENTS

AU 755879 2/2001
EP 0058488 8/1982
(Continued)

*Primary Examiner* — James S. McClellan
(74) *Attorney, Agent, or Firm* — Neal, Gerber & Eisenberg LLP

(57) ABSTRACT

A gaming system including a cascading symbol or tumbling reel game which utilizes zero, one or more multiple symbol display position elements. Each multiple symbol display position element is configured to occupy or span a plurality of symbol display positions of a symbol display position matrix. For a generated multiple symbol display position element to be removed from the symbol display matrix, each of the individual symbols of the multiple symbol display position element must individually qualify to be removed from the symbol display matrix.

13 Claims, 14 Drawing Sheets

(56) References Cited

U.S. PATENT DOCUMENTS 5,205,555 A 4/1993 Hamano
RE34,244 E 5/1993 Hagiwara
5,395,111 A 3/1995 Inoue
5,564,700 A 10/1996 Celona
5,624,119 A 4/1997 Leake
5,704,835 A 1/1998 Dietz, II
5,720,662 A 2/1998 Holmes et al.
5,722,891 A 3/1998 Inoue
5,769,716 A 6/1998 Saffari et al.
5,807,172 A 9/1998 Piechowiak
5,813,911 A 9/1998 Margolin
5,833,537 A 11/1998 Barrie
5,882,260 A 3/1999 Marks et al.
5,934,672 A 8/1999 Sines et al.
5,951,397 A 9/1999 Dickinson
5,980,384 A 11/1999 Barrie
6,089,977 A 7/2000 Bennett
6,117,013 A 9/2000 Eiba
6,120,377 A 9/2000 McGinnis et al.
6,139,124 A 10/2000 Kling
6,174,235 B1 1/2001 Walker et al.
6,203,009 B1 3/2001 Sines et al.
6,220,959 B1 4/2001 Holmes et al.
6,224,484 B1 5/2001 Okuda et al.
6,227,971 B1 5/2001 Weiss
6,241,607 B1 6/2001 Payne et al.
6,251,013 B1 6/2001 Bennett
6,254,481 B1 7/2001 Jaffe
6,270,412 B1 8/2001 Crawford et al.
6,311,976 B1 11/2001 Yosoloff et al.
6,318,721 B1 11/2001 Randall et al.
6,347,996 B1 2/2002 Gilmore et al.
6,375,570 B1 4/2002 Poole
6,394,902 B1 5/2002 Glavich et al.
6,398,644 B1 6/2002 Perrie et al.
6,409,602 B1 6/2002 Wilshire et al.
6,413,162 B1 7/2002 Baerlocher et al.
6,419,579 B1 7/2002 Bennett
6,464,581 B1 10/2002 Yoseloff et al.
6,517,432 B1 2/2003 Jaffe
6,561,900 B1 5/2003 Baerlocher et al.
6,604,740 B1 8/2003 Singer et al.
6,634,945 B2 10/2003 Glavich et al.
6,641,477 B1 11/2003 Dietz
6,666,767 B1 12/2003 Dayan
6,672,690 B1 1/2004 Williams
6,676,511 B2 1/2004 Payne et al.
6,676,512 B2 1/2004 Fong et al.
6,695,696 B1 2/2004 Kaminkow
6,702,671 B2 3/2004 Tarantino
6,712,693 B1 3/2004 Hettinger
6,715,756 B2 4/2004 Inoue
6,731,313 B1 5/2004 Kaminkow
6,805,349 B2 10/2004 Baerlocher et al.
6,832,957 B2 12/2004 Falconer
6,855,054 B2 2/2005 White et al.
6,875,106 B2 4/2005 Weiss et al.
6,896,617 B2 5/2005 Daly
6,905,405 B2 6/2005 McClintic
6,910,962 B2 6/2005 Marks et al.
6,921,334 B1 7/2005 Bennett
6,942,571 B1 9/2005 McAllister et al.
6,960,133 B1 11/2005 Marks et al.
6,981,635 B1 1/2006 Hughs-Baird et al.
6,988,947 B2 1/2006 Baerlocher et al.
7,014,560 B2 3/2006 Glavich et al.
7,052,395 B2 5/2006 Glavich et al.
7,070,502 B1 7/2006 Bussick et al.
7,077,745 B2 7/2006 Gomez et al.
7,108,602 B2 9/2006 Daly
7,144,322 B2 12/2006 Gomez et al.
7,195,559 B2 3/2007 Gilmore et al.
7,252,591 B2 8/2007 Van Asdale
7,281,977 B2 10/2007 Jones
7,294,058 B1 11/2007 Slomiany et al.
7,311,607 B2 12/2007 Tedsen et al.
7,357,713 B2 4/2008 Marks et al.
7,402,102 B2 7/2008 Marks et al.
7,585,219 B2 9/2009 Randall et al.
7,591,724 B2 9/2009 Baerlocher
7,611,406 B2 11/2009 Fuller
7,625,281 B2 12/2009 Bilyeu et al.
7,666,085 B2 2/2010 Vorias et al.
7,695,363 B2 4/2010 Gilliland et al.
7,699,698 B2 4/2010 Randall
7,699,699 B2 4/2010 Gilliland et al.
7,717,787 B2 5/2010 Walker et al.
7,740,536 B2 6/2010 Pederson et al.
7,749,063 B2 7/2010 Belger et al.
7,753,773 B2 7/2010 Baerlocher et al.
7,914,376 B2 3/2011 Walker et al.
7,950,994 B2 5/2011 Berman et al.
8,002,625 B2 8/2011 Maya
8,007,357 B2 8/2011 Cuddy et al.
8,021,226 B2 9/2011 Souza et al.
8,083,581 B2 12/2011 Marks et al.
8,096,877 B2 1/2012 Hoffman
8,105,151 B2 1/2012 Caputo et al.
8,152,623 B2 4/2012 Fiden
8,162,741 B2 4/2012 Wadleigh et al.
8,172,665 B2 5/2012 Hoffman et al.
8,192,272 B2 6/2012 Thomas et al.
8,192,275 B2 6/2012 Aoki et al.
8,221,206 B2 7/2012 Marks et al.
8,226,468 B2 7/2012 Hoffman et al.
8,277,308 B2 10/2012 Baerlocher et al.
8,287,357 B2 10/2012 Evans
8,323,091 B2 12/2012 Frank et al.
8,366,538 B1 2/2013 Saunders et al.
8,371,930 B1 2/2013 Saunders et al.
8,414,380 B2 4/2013 Saunders et al.
8,444,473 B2 5/2013 Ching et al.
8,512,138 B2 * 8/2013 Saunders ............ G07F 17/3213
463/31
8,602,871 B2 12/2013 Wadleigh et al.
2002/0068623 A1 6/2002 Gauselmann
2002/0077165 A1 6/2002 Bansemer et al.
2003/0008698 A1 1/2003 Stone
2003/0027622 A1 2/2003 Osawa
2003/0027623 A1 2/2003 Rose
2003/0036422 A1 2/2003 Baerlocher et al.
2003/0045345 A1 3/2003 Bermin
2003/0054874 A1 3/2003 Kaminkow
2003/0057645 A1 3/2003 Baerlocher
2003/0060267 A1 3/2003 Glavich
2003/0100356 A1 5/2003 Brown et al.
2003/0157981 A1 8/2003 Marks et al.
2004/0033829 A1 2/2004 Pacey et al.
2004/0043809 A1 3/2004 Gomez et al.
2004/0048646 A1 3/2004 Visocnik
2004/0048650 A1 3/2004 Mierau et al.
2004/0048651 A1 3/2004 Vorias et al.
2004/0097280 A1 5/2004 Gauselmann
2005/0037836 A1 2/2005 Gilmore et al.
2005/0054418 A1 3/2005 Baerlocher
2005/0059478 A1 3/2005 Peterson et al.
2005/0148381 A1 7/2005 Marks et al.
2005/0282620 A1 12/2005 Marks et al.
2005/0288094 A1 12/2005 Marks et al.
2006/0046830 A1 3/2006 Webb
2006/0068881 A1 3/2006 Casey
2006/0068886 A1 3/2006 Takano et al.
2006/0172795 A1 8/2006 Bussick et al.
2007/0026933 A1 2/2007 Tanimura
2007/0060248 A1 3/2007 Rodgers et al.
2007/0155474 A1 7/2007 Gauselmann
2008/0032784 A1 2/2008 Englman
2008/0045309 A1 2/2008 Okada
2008/0051174 A1 2/2008 Fiden
2008/0090655 A1 4/2008 Marks et al.
2008/0108409 A1 5/2008 Cole et al.
2008/0108411 A1 * 5/2008 Jensen ................ G07F 17/3286
463/20
2008/0113735 A1 5/2008 Maya

(56) References Cited

U.S. PATENT DOCUMENTS

| | | | |
|---|---|---|---|
| 2008/0182644 | A1 | 7/2008 | Lutnick et al. |
| 2008/0188286 | A1 | 8/2008 | Jaffe |
| 2008/0227521 | A1 | 9/2008 | Aoki et al. |
| 2009/0104964 | A1 | 4/2009 | Snow |
| 2009/0124325 | A1 | 5/2009 | Wadleigh et al. |
| 2009/0124342 | A1 | 5/2009 | Fong |
| 2009/0124347 | A1 | 5/2009 | Rodgers et al. |
| 2009/0227337 | A1 | 9/2009 | Langille et al. |
| 2010/0004050 | A1 | 1/2010 | Caputo |
| 2010/0022297 | A1 | 1/2010 | Saunders |
| 2010/0029364 | A1 | 2/2010 | Zielinski |
| 2010/0120507 | A1 | 5/2010 | Rodgers et al. |
| 2010/0124972 | A1 | 5/2010 | Rodgers |
| 2010/0234089 | A1 | 9/2010 | Saffari et al. |
| 2010/0234091 | A1 | 9/2010 | Baerlocher et al. |
| 2011/0111825 | A1 | 5/2011 | Caputo |
| 2011/0130193 | A1 | 6/2011 | Belger et al. |
| 2011/0201406 | A1 | 8/2011 | Jaffe et al. |
| 2012/0172106 | A1 | 7/2012 | Caputo et al. |
| 2013/0053122 | A1 | 2/2013 | Spark-Stahl et al. |
| 2013/0053128 | A1 | 2/2013 | Spark-Stahl et al. |
| 2013/0143635 | A1 | 6/2013 | Arora et al. |
| 2013/0184050 | A1 | 7/2013 | Zoble et al. |
| 2013/0190066 | A1 | 7/2013 | Saunders et al. |
| 2013/0190067 | A1 | 7/2013 | Saunders |
| 2013/0217463 | A1 | 8/2013 | Hughes et al. |

FOREIGN PATENT DOCUMENTS

| | | |
|---|---|---|
| EP | 0060019 | 9/1982 |
| EP | 1063622 | 12/2000 |
| GB | 1454046 | 10/1976 |
| GB | 2062922 | 5/1981 |
| GB | 2106293 | 9/1981 |
| GB | 2097160 | 10/1982 |
| GB | 2106295 | 4/1983 |
| GB | 2165385 | 4/1986 |
| GB | 2180087 | 8/1989 |
| GB | 2243236 | 4/1990 |
| GB | 2372132 | 2/2001 |
| WO | WO1998/020949 | 5/1998 |
| WO | WO2000/030727 | 6/2000 |
| WO | WO2006/076294 | 7/2006 |
| WO | WO2007/002935 | 1/2007 |
| WO | WO2007/130443 | 11/2007 |
| WO | WO2007/130444 | 11/2007 |

* cited by examiner 1116,1118

GAMING SYSTEM AND METHOD FOR PROVIDING A CASCADING SYMBOL GAME WITH MULTIPLE SYMBOL DISPLAY POSITION ELEMENTS

PRIORITY CLAIM

This application is a continuation of, claims the benefit of and priority to U.S. patent application Ser. No. 17/078,362, filed on Oct. 23, 2020, which is a continuation of, claims the benefit of and priority to U.S. patent application Ser. No. 16/045,160, filed on Jul. 25, 2018, which is a continuation of, claims the benefit of and priority to U.S. patent application Ser. No. 15/052,532, filed on Feb. 24, 2016, which is a continuation of, claims the benefit of and priority to U.S. patent application Ser. No. 14/028,896, filed on Sep. 17, 2013, now U.S. Pat. No. 9,275,524, issued on Mar. 1, 2016, the entire contents of which are each incorporated by reference herein.

COPYRIGHT NOTICE

A portion of the disclosure of this patent document contains material which is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). In such known gaming machines, the amount of the wager made on the base game by the player can vary.

Gaming machines which provide cascading symbol or tumbling reel games are also known. In one such cascading symbol or tumbling reel game, a gaming machine generates and displays a plurality of symbols in a symbol display position matrix or grid. This symbol display position matrix includes a plurality of symbol display positions. Each symbol display position is associated with a specific row and a specific column of the symbol display position matrix. In such a cascading symbol game, the gaming machine evaluates the displayed symbols and provides an award for each winning symbol combination formed. The gaming machine then removes the displayed symbols that form any winning symbol combination to create one or more empty symbol display positions. The gaming machine shifts zero, one, or more of the remaining displayed symbols downward into zero, one, or more of the created empty symbol display positions. If any empty symbol display positions remain, the gaming machine generates and displays a symbol for each remaining empty symbol display position. The gaming machine then evaluates the displayed symbols and provides any award for any winning symbol combinations formed. If winning symbol combinations continue to be formed, the gaming machine repeats the steps of removing generated symbols, shifting generated symbols, generating new symbols, and evaluating generated symbols until no winning symbol combinations remain.

There is a continuing need to increase the level of excitement and entertainment for people playing gaming machines. There is a further need for increasing the number of winning symbol combinations generated and awards provided to a player for a single wager on a play of a game.

SUMMARY

The present disclosure relates generally to gaming systems and methods for providing a cascading symbol game with multiple symbol display position elements.

In various embodiments, the gaming system disclosed herein includes a cascading symbol or tumbling reel game which utilizes zero, one or more multiple symbol display position elements. Each multiple symbol display position element is configured to occupy or span a plurality of symbol display positions of a symbol display position matrix. Specifically, each multiple symbol display position element includes or is otherwise associated with a plurality of individual symbols that each are configured to occupy an individual symbol display position of a symbol display position matrix. In these embodiments, for a generated multiple symbol display position element to be removed from the symbol display matrix, each of the individual symbols of the multiple symbol display position element must individually qualify to be removed from the symbol display matrix. Put differently, regardless of one or more of the individual symbols of the multiple symbol display position element individually qualifying to be removed, unless each of the symbols of the multiple symbol display position element collectively qualify as a group to be removed, none of the symbols of the multiple symbol display position element are removed. Such a configuration provides an increased level of volatility (and excitement for certain players) by utilizing an additional condition to satisfy prior to any of the symbols of a multiple symbol display position element being removed.

More specifically, in operation of certain embodiments, for a play of a game and in association with: (i) an initial generation of one or more symbols in one or more symbol display positions of a symbol display position matrix, (ii) a shifting of one or more previously generated symbols (following the removal of one or more generated symbols) into one or more created empty symbol display positions of the symbol display position matrix, and/or (iii) a subsequent generation of one or more symbols (following any shifting of any previously generated symbols) into one or more symbol display positions of the symbol display position matrix, the gaming system generates zero, one or more multiple symbol display position elements.

If the gaming system generates a multiple symbol display position element, the gaming system determines if each individual symbol of the generated multiple symbol display position element should be removed. In one embodiment, this determination includes determining if each of the individual symbols of the generated multiple symbol display position element are included in one or more winning symbol combinations.

If each individual symbol of the generated multiple symbol display position element should be removed, the gaming system removes the generated multiple symbol display position element (i.e., the gaming system removes each individual symbol of the generated multiple symbol display position element). For example, if the gaming system removes symbols based on such symbols being part of a winning symbol combination, the gaming system removes the generated multiple symbol display position element if each individual symbol of the generated multiple symbol display position element is part of a winning symbol combination (or part of the same winning symbol combination). Such a removal of the generated multiple symbol display position element creates a plurality of empty symbol display positions.

On the other hand, if at least one of the individual symbols of the generated multiple symbol display position element should not be removed, the gaming system does not remove the generated multiple symbol display position element. That is, if at least one of the individual symbols of the generated multiple symbol display position element should be removed and at least one of the individual symbols of the generated multiple symbol display position element should not be removed, the gaming system does not remove any of the individual symbols of the generated multiple symbol display position element. Put differently, unless each of the individual symbols of the generated multiple symbol display position element qualify to be removed, the gaming system removes none of the individual symbols of the generated multiple symbol display position element. In other words, since a multiple symbol display position element includes a plurality of linked symbols, the removal of one of these symbols corresponds to a removal of each of the linked symbols. Such a configuration provides an increased amount of excitement and enjoyment for certain players as such players enjoy the anticipation associated with not knowing if a multiple symbol display position element will be removed until each symbol of the multiple symbol display position element is evaluated.

Following the removal of any generated multiple symbol display position elements (and the removal of any other generated symbols), the gaming system shifts or repositions zero, one or more of the remaining displayed symbols into zero, one, or more of the created empty symbol display positions. It should be appreciated that if any symbols of the multiple symbol display position element are shifted or repositioned, each of the symbols of the multiple symbol display position element are shifted or repositioned. That is, since a multiple symbol display position element includes a plurality of linked symbols, the movement of one of these symbols corresponds to a movement of each of the linked symbols.

Following the shifting or repositioning of zero, one or more symbols, if any empty symbol display positions remain, the gaming system generates and displays a symbol for each remaining empty symbol display position. The gaming system repeats this process until no more symbols (either the symbols of a multiple symbol display position element or the remaining displayed symbols) are to be removed, such as when no more winning symbol combinations are formed. Such a configuration of removing symbols and generating additional symbols provides the player one or more additional award opportunities in association with one play of a game.

Additional features and advantages are described in, and will be apparent from, the following Detailed Description and the figures.

DETAILED DESCRIPTION

Cascading Symbol Game

In various embodiments, the gaming system disclosed herein includes a cascading symbol or tumbling reel game which utilizes one or more multiple symbol display position elements. Each multiple symbol display position element occupies or spans a plurality of symbol display positions of a symbol display position matrix. Specifically, each multiple symbol display position element includes or is otherwise associated with a plurality of individual symbols that each are configured to occupy an individual symbol display position of a symbol display position matrix. In these embodiments, for a generated multiple symbol display position element to be removed from the symbol display matrix, each of the individual symbols of the multiple symbol display position element must individually qualify to be removed from the symbol display matrix. Put differently, regardless of one or more of the individual symbols of the multiple symbol display position element individually qualifying to be removed, unless each of the symbols of the multiple symbol display position element collectively qualify as a group to be removed, none of the symbols of the multiple symbol display position element are removed. Such a configuration provides an increased level of volatility (and excitement for certain players) by utilizing an additional condition to satisfy prior to any of the symbols of a multiple symbol display position element being removed.

While certain of the embodiments described below are directed to playing the cascading symbol game as a primary or base game, it should be appreciated that the present disclosure may additionally or alternatively be employed as a secondary or bonus game. Moreover, while the player's credit balance, the player's wager, and any awards are displayed as an amount of monetary credits or currency in the embodiments described below, one or more of such player's credit balance, such player's wager, and any awards provided to such player may be for non-monetary credits, promotional credits, and/or player tracking points or credits.

Figure 1:
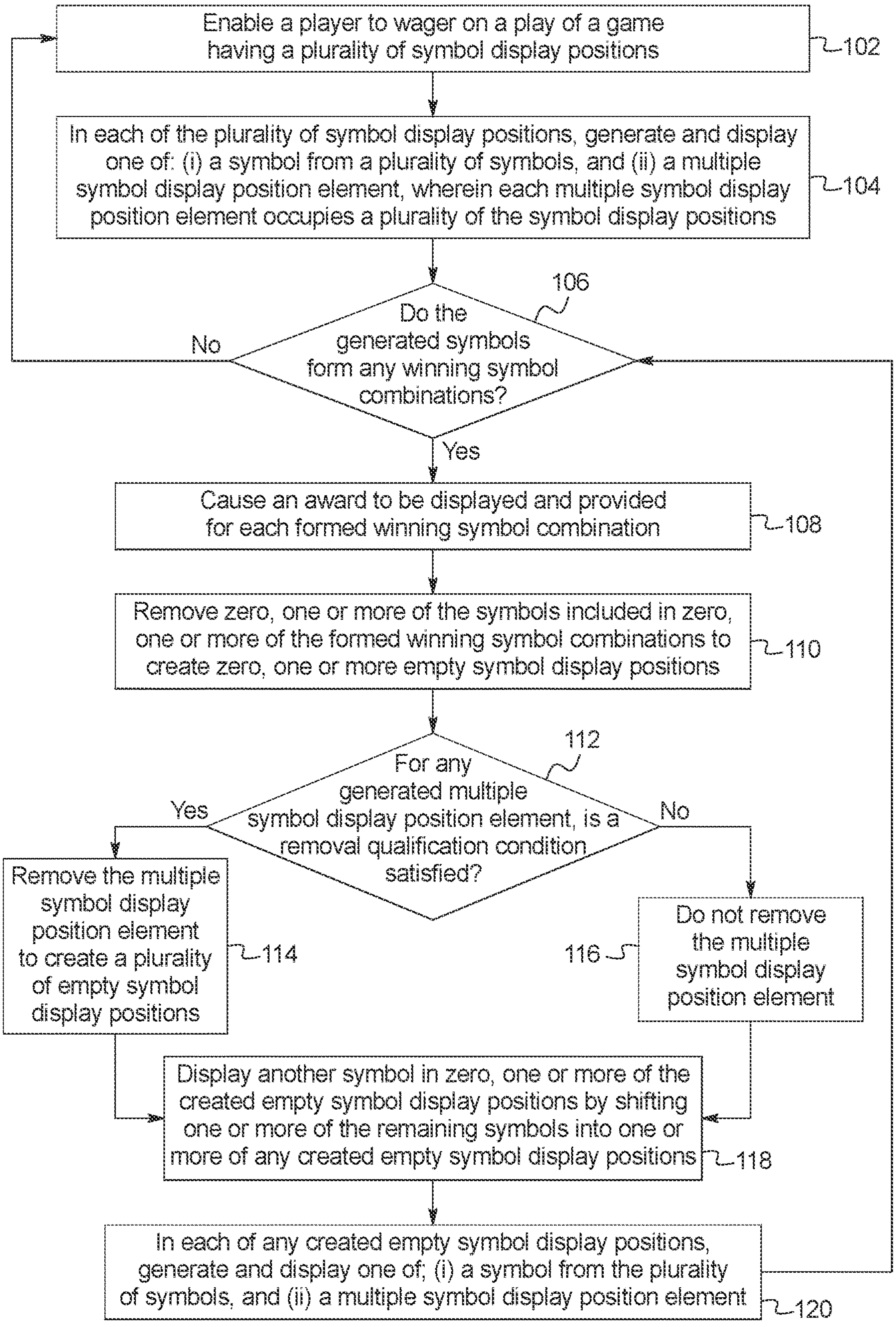
FIG. 1 is a flow chart an example process for operating a gaming system providing one embodiment of a cascading symbol game which employs multiple symbol display position elements as disclosed herein.

Referring now to FIG. 1, a flowchart of an example embodiment of a process for operating a gaming system or a gaming device disclosed herein is illustrated. In one embodiment, this process is embodied in one or more software programs stored in one or more memories and executed by one or more processors or servers. Although this process is described with reference to the flowchart illustrated in FIG. 1, it should be appreciated that many other methods of performing the acts associated with this process may be used. For example, the order of certain steps described may be changed, or certain steps described may be optional.

In one embodiment, as indicated in block 102, the gaming system enables a player to wager on a play of a game having a plurality of symbol display positions. In one embodiment, the symbol display positions form a single symbol display position matrix or grid. In another embodiment, the symbol display positions form a plurality of linked (or partially linked) symbol display position matrixes or grids. In different embodiments, one or more symbol display position grids are arranged in a plurality of rows and a plurality of columns or arranged in any suitable configuration to form any suitable shape.

For the wagered on play of the game, as indicated in block 104, the gaming system generates and displays, at each of the plurality of symbol display positions, one of: (i) a symbol from a plurality of symbols, and (ii) a multiple symbol display position element, wherein each multiple symbol display position element occupies a plurality of the symbol display positions.

In various embodiments, each multiple symbol display position element includes or is otherwise associated with a plurality of individual symbols that each occupy an individual one of the symbol display positions. In certain such embodiments, one or more multiple symbol display position elements each include a plurality of symbols associated with a plurality of symbol display positions of the multiple symbol display position element. In these embodiments, the plurality of symbol display positions of the multiple symbol display position element correspond to a plurality of the symbol display positions of the symbol display position grid such that the symbols of the multiple symbol display position element span, occupy or are otherwise associated with a plurality of the symbol display positions of the symbol display position grid. In certain other embodiments, one or more of the multiple symbol display position elements are formed by linking or otherwise coupling a plurality of individual symbols, such that when displayed, the multiple symbol display position element (formed from the plurality of individual symbols) spans, occupies or is otherwise associated with a plurality of the symbol display positions.

In one embodiment, zero, one or more of each individual symbols of one or more multiple symbol display position elements are individual wild symbols. In this embodiment, if generated, a wild symbol functions as or otherwise changes to a different symbol, such as a symbol that causes a non-winning symbol combination to become a winning symbol combination. For example, as seen in FIG. 2A, at a plurality of symbol display positions 150 of a symbol display position grid 152, the gaming system generates zero, one or more symbols 154 and zero, one or more multiple symbol display position elements 156 (which function as a plurality of wild symbols).

Figure 2A:
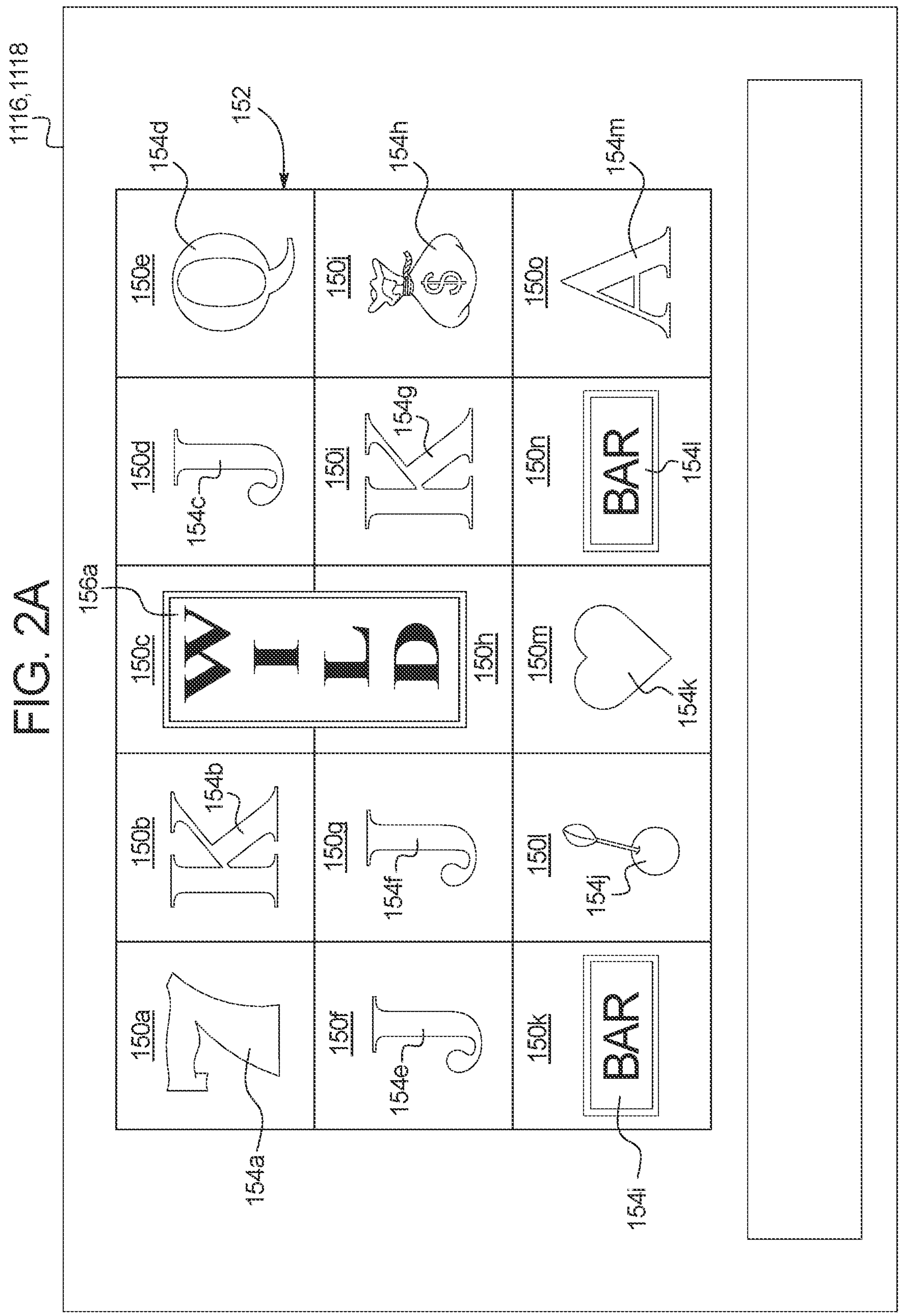
FIGS. 2A, 2B, 2C, 2D, 2E, 2F, 2G, 2H and 2I are front views of one embodiment of the gaming system disclosed herein illustrating a play of a cascading symbol game which employs multiple symbol display position elements.

Specifically, as seen in FIG. 2A, the gaming system generated symbols 154*a*, 154*b*, 154*c*, 154*d*, 154*e*, 154*f*, 154*g*, 154*h*, 154*i*, 154*j*, 154*k*, 1541 and 154*m* at symbol display positions 150*a*, 150*b*, 150*d*, 150*e*, 150*f*, 150*g*, 150*i*, 150*j*, 150*k*, 1501, 150*m*, 150*n* and 150*o*, respectively, of symbol display position grid 152. As also seen in FIG. 2A, the gaming system generated multiple symbol display position element 156*a* at symbol display positions 150*c* and 150*h* of symbol display position grid 152. As seen in this example, multiple symbol display position element 156*a* is displayed and evaluated as a wild symbol spanning a plurality of symbol display positions.

Following the generation and display of the plurality of symbols and the multiple symbol display position element at the plurality of symbol display positions, the gaming system determines whether the generated symbols (including any displayed symbols of any multiple symbol display position elements) form any winning symbol combinations as indicated in diamond 106 of FIG. 1.

If the generated symbols did not form any winning symbol combinations, the gaming system terminates the play of the cascading symbols game and returns to block 102 for another placement of another wager on any play of the cascading symbols game.

On the other hand, if the generated symbols form one or more winning symbol combinations as indicated in block 108, the gaming system causes an award to be displayed and provided for each formed winning symbol combination.

Figure 2B:
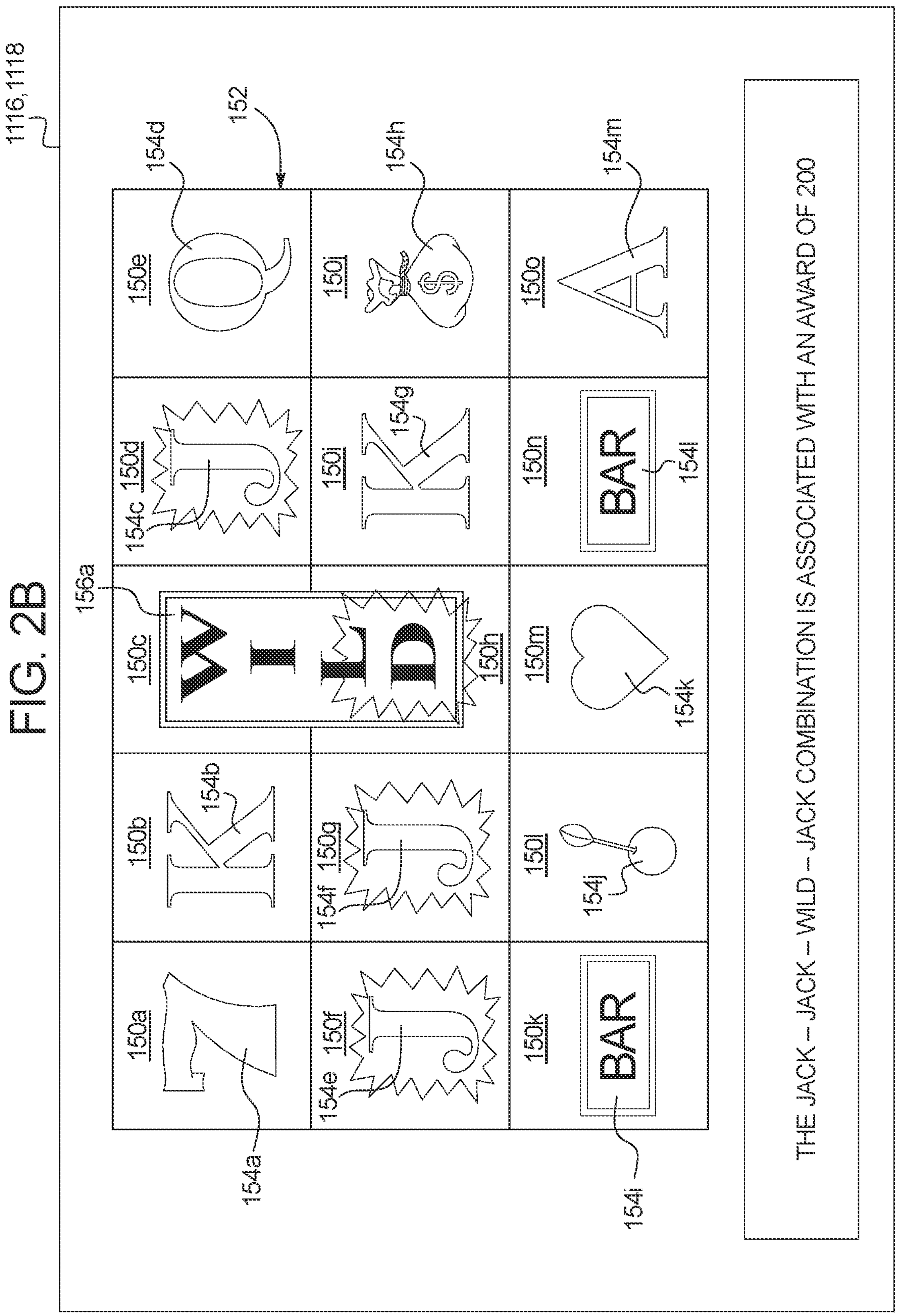

As seen in FIG. 2B, upon determining that the symbol combination of jack symbol 154*e*-jack symbol 154*f*—a second wild symbol of multiple symbol display position element 156*a*-jack symbol 154*c* is a winning symbol combination, the gaming system provides the player an award of two-hundred credits associated with this winning symbol combination. In this example, the gaming system provides appropriate messages such as "THE JACK-JACK-WILD-JACK COMBINATION IS ASSOCIATED WITH AN AWARD OF 200" to the player visually, or through suitable audio or audiovisual displays.

Following providing the player any awards associated with any winning symbol combinations, the gaming system removes zero, one or more of the symbols included in zero, one or more of the formed winning symbol combinations to create zero, one or more empty symbol display positions as indicated in block 110 of FIG. 1.

Figure 2C:
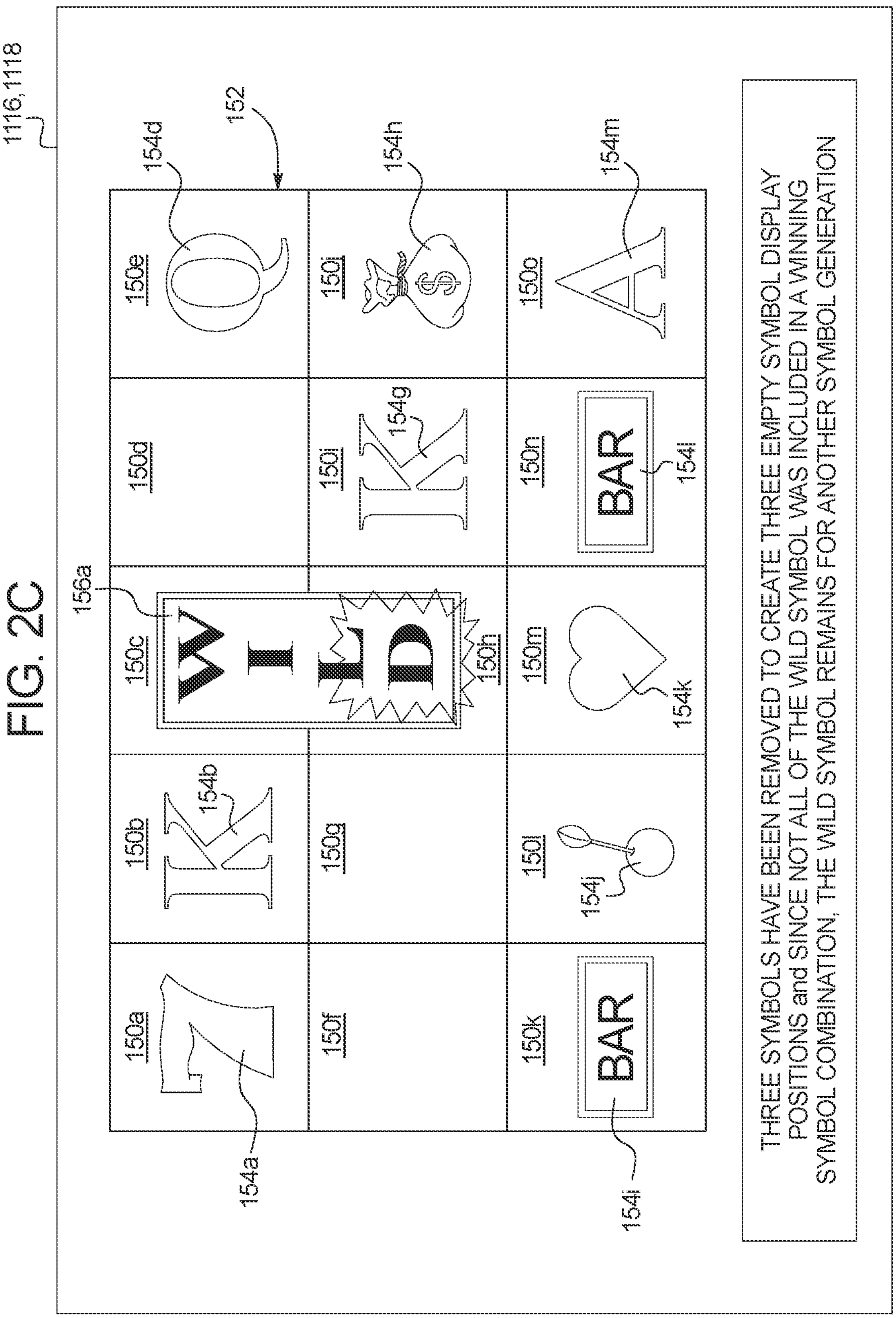

For example, as seen in FIG. 2C, the gaming system removes jack symbol 154*e*, jack symbol 154*f* and jack symbol 154*c* which partially form the winning symbol combination. This removal creates empty symbol display positions 150*f*, 150*g* and 150*d*.

Following the removal of one or more of the symbols included in one or more of the formed winning symbol combinations, the gaming system determines, for any generated multiple symbol display position element, if a removal qualification condition is satisfied as indicated in diamond 112 of FIG. 1.

In one embodiment, for a generated multiple symbol display position element to satisfy a removal qualification condition, each of the individual symbols of the multiple symbol display position element must individually qualify to be removed. That is, regardless of one or more of the individual symbols of the multiple symbol display position element individually qualifying to be removed, unless each of the symbols of the multiple symbol display position element collectively qualify as a group to be removed, the multiple symbol display position element does not satisfy the removal qualification condition.

In one embodiment, as described below in the illustrated example, the removal qualification condition is satisfied for a generated multiple symbol display position element if each of the symbols of the multiple symbol display position element are included in any formed winning symbol combinations. In another embodiment, the removal qualification condition is satisfied for a generated multiple symbol display position element if each of the symbols of the multiple symbol display position element are included in the same formed winning symbol combination. In another embodiment, the removal qualification condition is satisfied for a generated multiple symbol display position element if each of the symbols of the multiple symbol display position element are included in different winning symbol combinations. In these embodiments, the gaming system indicates to the player which symbols of which multiple symbol display position elements have been involved in any winning symbol combinations.

If the removal qualification condition is satisfied for a generated multiple symbol display position element, the gaming system removes the multiple symbol display position element to create a plurality of empty symbol display positions as indicated in block 114 of FIG. 1. That is, if each individual symbol of the generated multiple symbol display position element should be removed, the gaming system removes the generated multiple symbol display position element (i.e., the gaming system removes each individual symbol of the generated multiple symbol display position element). For example, if the gaming system removes symbols based on such symbols being part of a winning symbol combination, the gaming system removes the generated multiple symbol display position element if each individual symbol of the generated multiple symbol display position element is part of a winning symbol combination (or part of the same winning symbol combination).

On the other hand, if the removal qualification condition is not satisfied for a generated multiple symbol display position element, the gaming system does not remove the multiple symbol display position element as indicated in block 116. That is, if at least one of the individual symbols of the generated multiple symbol display position element should not be removed, the gaming system does not remove the generated multiple symbol display position element. Put differently, if at least one of the individual symbols of the generated multiple symbol display position element should be removed and at least one of the individual symbols of the generated multiple symbol display position element should not be removed, the gaming system does not remove any of the individual symbols of the generated multiple symbol display position element. In other words, since a multiple symbol display position element includes a plurality of linked symbols, the removal of one of these symbols corresponds to a removal of each of the linked symbols. Accordingly, unless each of the individual symbols of the generated multiple symbol display position element qualify to be removed, the gaming system removes none of the individual symbols of the generated multiple symbol display position element.

As seen in FIG. 2C, since each of the symbols of the multiple symbol display position element are not included in any formed winning symbol combinations, the removal qualification condition is not satisfied and multiple symbol display position element 156*a* is not removed. As seen in this example, even though one of the two wild symbols of multiple symbol display position element 156*a* is included in a winning symbol combination, since both of the two wild symbols of multiple symbol display position element 156*a* are not each included in a winning symbol combination, the removal qualification condition is not satisfied with regards to multiple symbol display position element 156*a*. In this example, the gaming system provides appropriate messages such as "THREE SYMBOLS HAVE BEEN REMOVED TO CREATE THREE EMPTY SYMBOL DISPLAY POSITIONS" and "SINCE NOT ALL OF THE WILD SYMBOL WAS INCLUDED IN A WINNING SYMBOL COMBINATION, THE WILD SYMBOL REMAINS FOR ANOTHER SYMBOL GENERATION" to the player visually, or through suitable audio or audiovisual displays.

Following the removal of one or more symbols from one or more symbol display positions and the removal of any multiple symbol display position elements, as indicated in block 118 of FIG. 1, the gaming system displays another symbol in zero, one or more of the created empty symbol display positions by shifting one or more of the remaining symbols into one or more of any empty symbol display positions.

In one embodiment, the gaming system shifts one or more symbols and one or more multiple symbol display position elements into any created empty symbol display position. In another embodiment, the gaming system shifts one or more symbols into any created empty symbol display position but does not shift any multiple symbol display position elements into any created symbol display positions. In another embodiment, the gaming system shifts one or more multiple symbol display position elements into any created empty symbol display position but does not shift any symbols into any created symbol display positions.

In one embodiment, the gaming system shifts zero, one or more symbols and/or zero, one or more multiple symbol display position elements into zero, one or more of the created empty symbol display positions according to applicable game rules. For example, under one set of applicable game rules wherein symbols and/or multiple symbol display position elements are shifted downward to fill empty symbol display positions, if a winning symbol combination results in a displayed empty symbol display position along a bottom row of symbol display positions, the gaming system will shift at least one symbol in a symbol display position above the empty symbol display position downward to fill the empty symbol display position. In this example, under these applicable set of game rules, if a winning symbol combination results in a displayed empty symbol display position along a top row of symbol display positions, the gaming system will not shift any symbols to fill the empty symbol display position. It should be appreciated that since each multiple symbol display position element occupies a plurality of symbol display positions, the gaming system shifts each multiple symbol display position element into a plurality of empty symbol display positions. It should be further appreciated that if any symbols of the multiple symbol display position element are shifted or repositioned, each of the symbols of the multiple symbol display position element are shifted or repositioned. That is, since a multiple symbol display position element includes a plurality of linked symbols, the movement of one of these symbols corresponds to a movement of each of the linked symbols.

In one such embodiment, the gaming system shifts any remaining symbols as many symbol display positions as possible in a designated direction, while maintaining the position of each shifted symbol relative to one or more other symbols or coordinates. For instance, the gaming system in one embodiment moves each symbol positioned in a symbol display position adjacently above an empty symbol display position of a column of a symbol display position matrix (displayed as a reel) downward as far as possible to occupy one or more empty symbol display positions while maintaining the relative order of the symbols of that column of the symbol display position matrix from top to bottom. In this embodiment, shifting the non-removed symbols does not result in fewer empty symbol display positions. Rather, shifting the non-removed symbols results in a plurality of different empty symbol display positions wherein each empty symbol display position has a given relationship to any remaining symbols, the relationship based on the direction of shifting. In one embodiment, for each of a plurality of columns of a symbol display position matrix, displayed as a plurality of reels, each of empty symbol display positions on the displayed reel resulting from shifting one or more non-removed symbols is above each of any remaining displayed symbols on the displayed reel. It should be appreciated that in various embodiments, shifting symbols downward (or upward, or sideways or diagonally or any suitable direction) to fill one or more empty symbol display positions causes a cascading, tumbling, or falling appearance of the symbols in the gaming system, which increases player excitement and enjoyment.

Figure 2D:
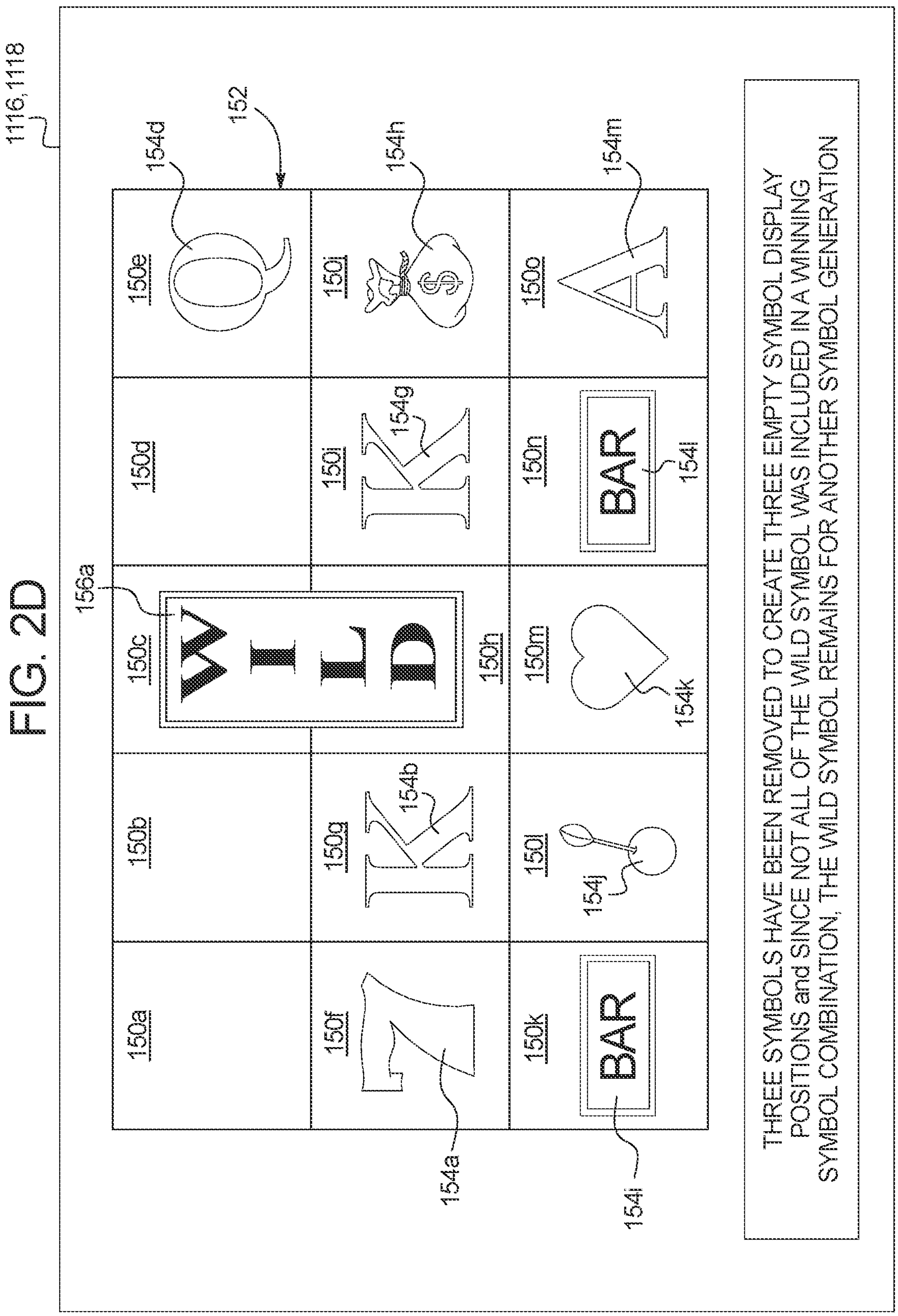

For example, as seen in FIGS. 2D, following the creation of empty symbol display positions 150*f*, 150*g* and 150*d*, the gaming system shifts seven symbol 154*a* and King symbol 154*b* into symbol display positions 150*f* and 150*g*, respectively, of the second or middle row of the symbol display position matrix. Such shifting creates empty symbol display positions 150*a* and 150*b*.

After shifting zero, one or more symbols and/or zero, one or more multiple symbol display position elements to create zero, one or more different empty symbol display positions, the gaming system generates and displays, at each of any empty plurality of symbol display positions, one of: (i) a symbol from the plurality of symbols, and (ii) a multiple symbol display position element as indicated in block 120 of FIG. 1.

Following the display of a symbol or a multiple symbol display position element in each of the created empty symbol display positions, the gaming system then returns to diamond 106 and proceeds with determining whether the generated symbols (i.e., the non-removed symbols from a previous generation and display of at least one symbol, the newly displayed symbols and any displayed symbols of any multiple symbol display position elements) form any winning symbol combinations.

Figure 2E:
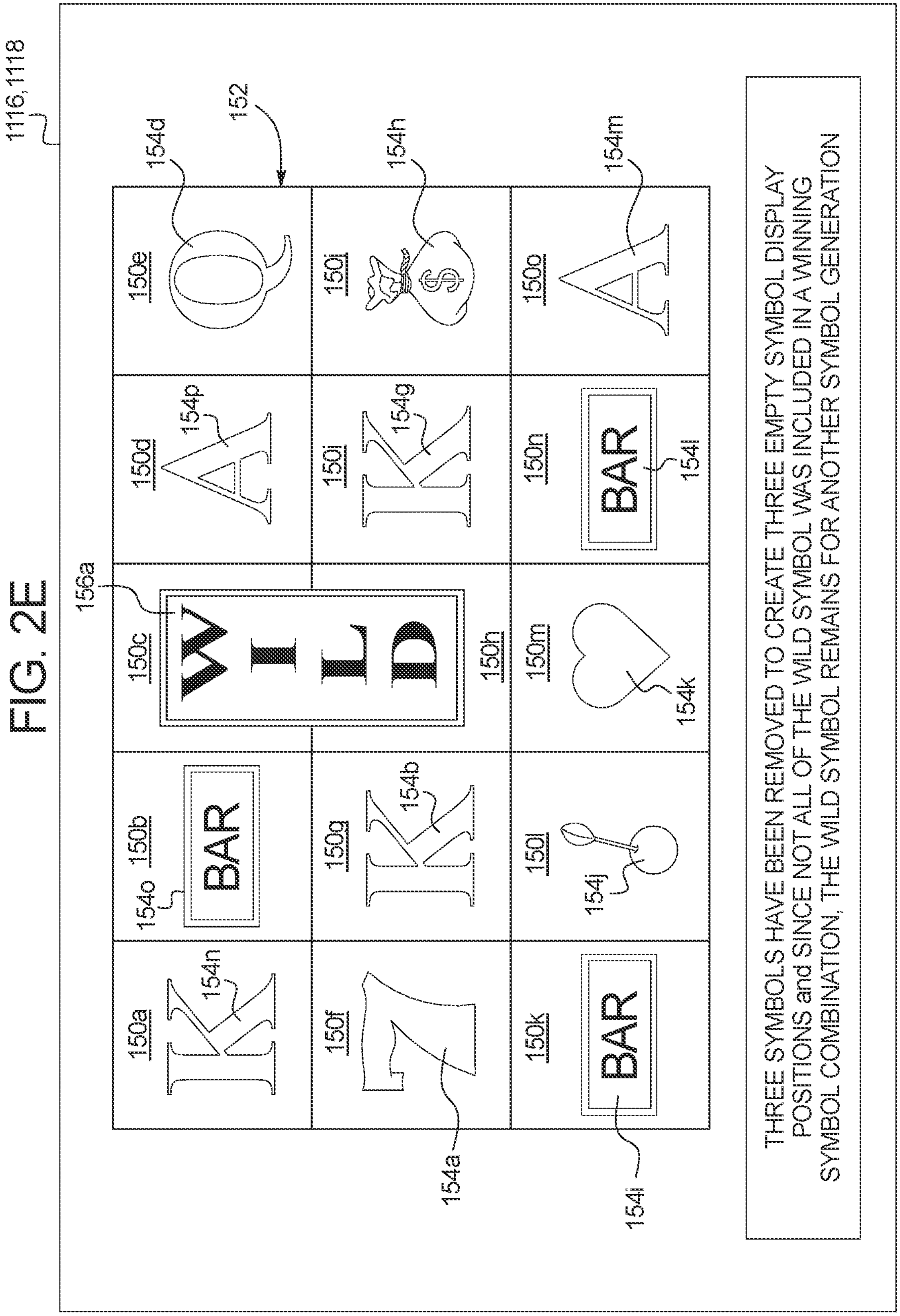

Continuing with the above example, as seen in FIG. 2E, following the shifting of a plurality of the remaining symbols, the gaming system generates King symbol 154*n*, singly bar symbol 154*o* and Ace symbol 154*p*, and displays these symbols at symbol display positions 150*a*, 150*b* and 150*d*, respectively, of the first or top row of the symbol display position matrix.

Figure 2F:
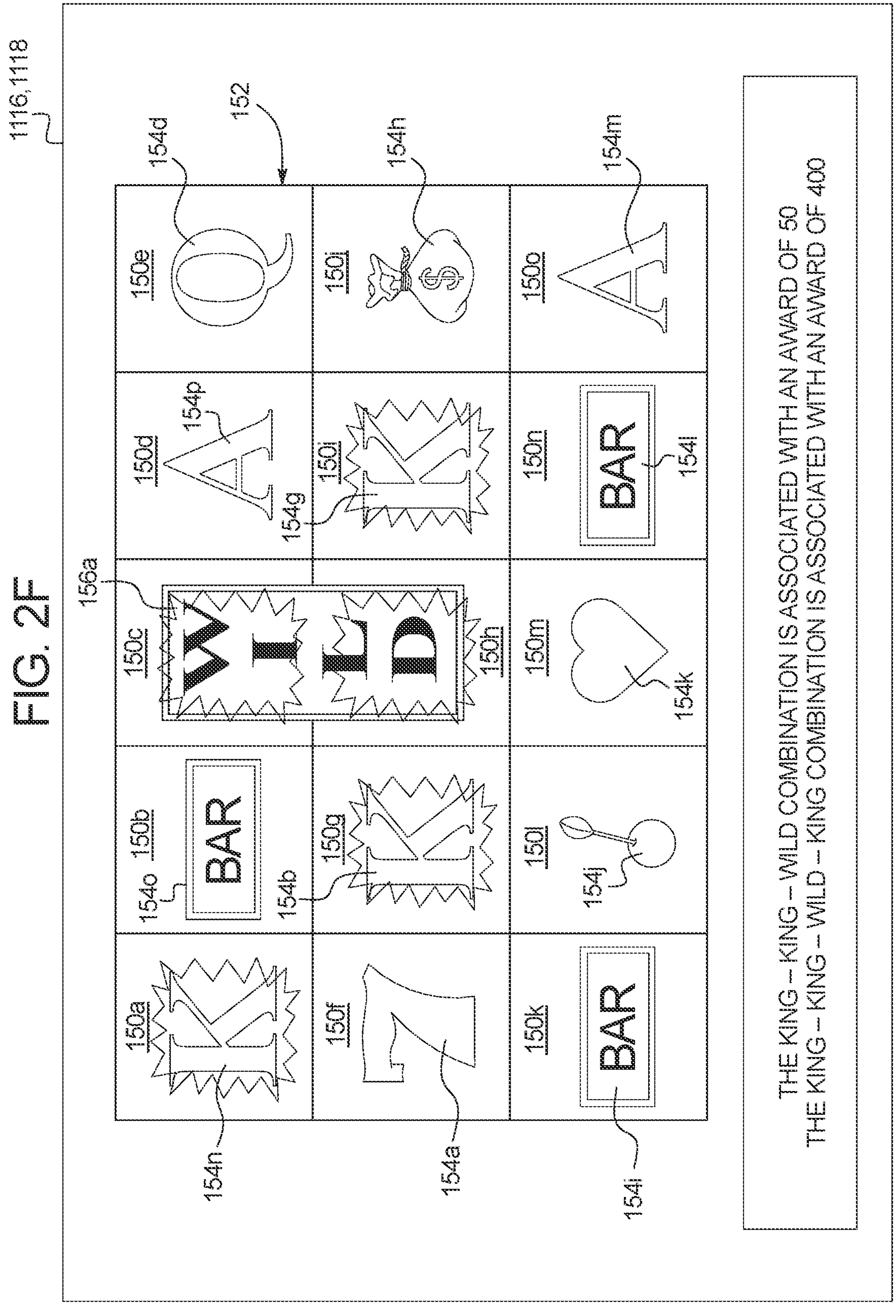

As seen in FIG. 2F, upon determining that the symbol combination of King symbol 154*n*-King symbol 154*b*—a first wild symbol of multiple symbol display position element 156*a* is a winning symbol combination, the gaming system provides the player an award of fifty credits associated with this winning symbol combination. As further seen in FIG. 2F, the symbol combination of King symbol 154*n*-King symbol 154*b*—a second wild symbol of multiple symbol display position element 156*a*-King symbol 154*g* is a winning symbol combination, the gaming system provides the player an award of four-hundred credits associated with this winning symbol combination. In this example, the gaming system provides appropriate messages such as "THE KING-KING-WILD COMBINATION IS ASSOCIATED WITH AN AWARD OF 50" and "THE KING-KING-WILD-KING COMBINATION IS ASSOCIATED WITH AN AWARD OF 400" to the player visually, or through suitable audio or audiovisual displays.

Figure 2G:
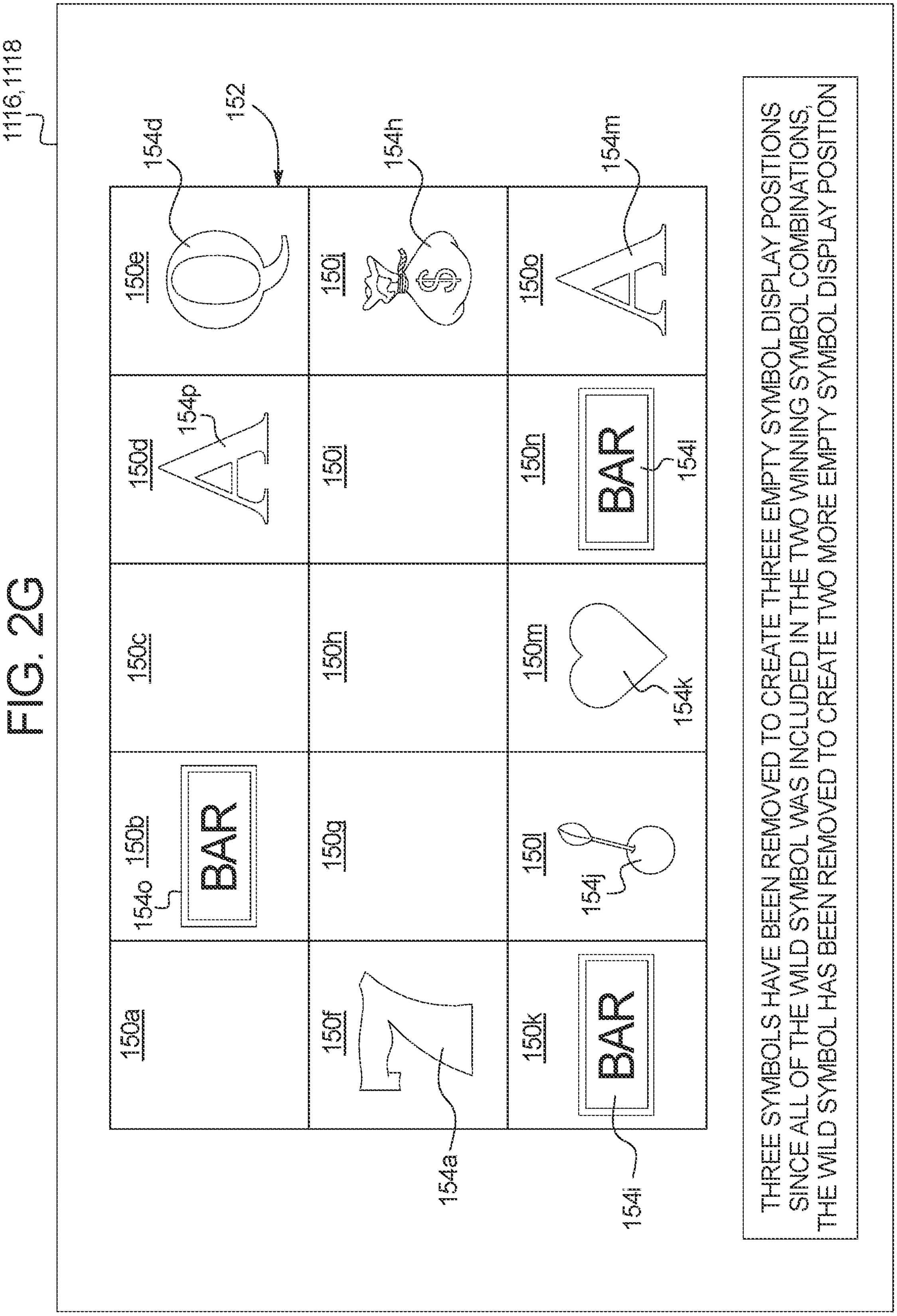

As seen in FIG. 2G, the gaming system removes King symbol 154*n*, King symbol 154*b* and King symbol 154*g* which partially form the winning symbol combination. This removal creates empty symbol display positions 150*a*, 150*g* and 150*i*.

As also seen in FIG. 2G, since each of the symbols of the multiple symbol display position element are included in a formed winning symbol combinations, the removal qualification condition is satisfied and the gaming system removes multiple symbol display position element 156*a*. This removal created empty symbol display positions 150*c* and 150*h*. In this example, the gaming system provides appropriate messages such as "THREE SYMBOLS HAVE BEEN REMOVED TO CREATE THREE EMPTY SYMBOL DISPLAY POSITIONS" and "SINCE ALL OF THE WILD SYMBOL WAS INCLUDED IN THE TWO WINNING SYMBOL COMBINATIONS, THE WILD SYMBOL HAS BEEN REMOVED TO CREATE TWO MORE EMPTY SYMBOL DISPLAY POSITION" to the player visually, or through suitable audio or audiovisual displays.

Figure 2H:
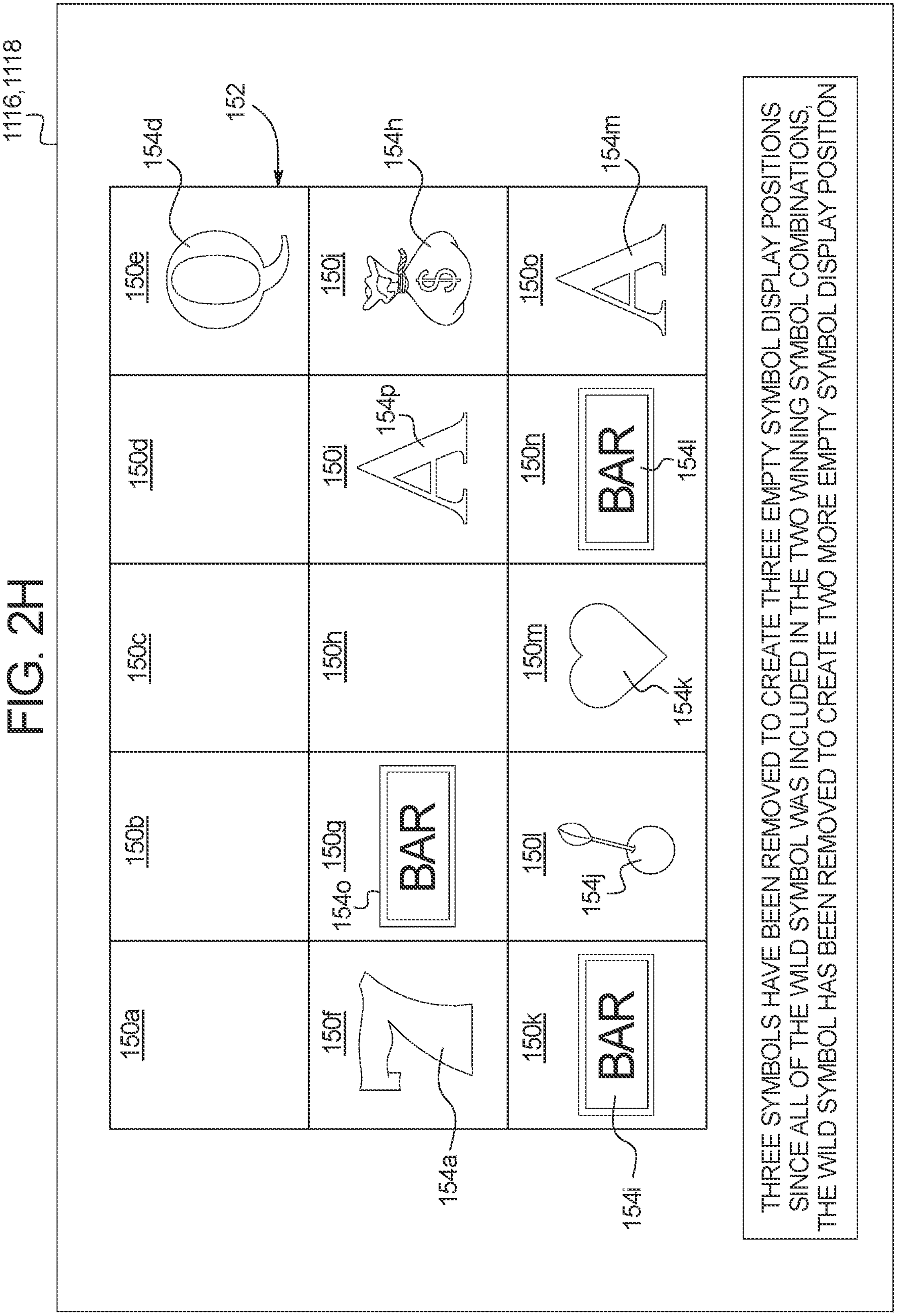
Figure 2I:
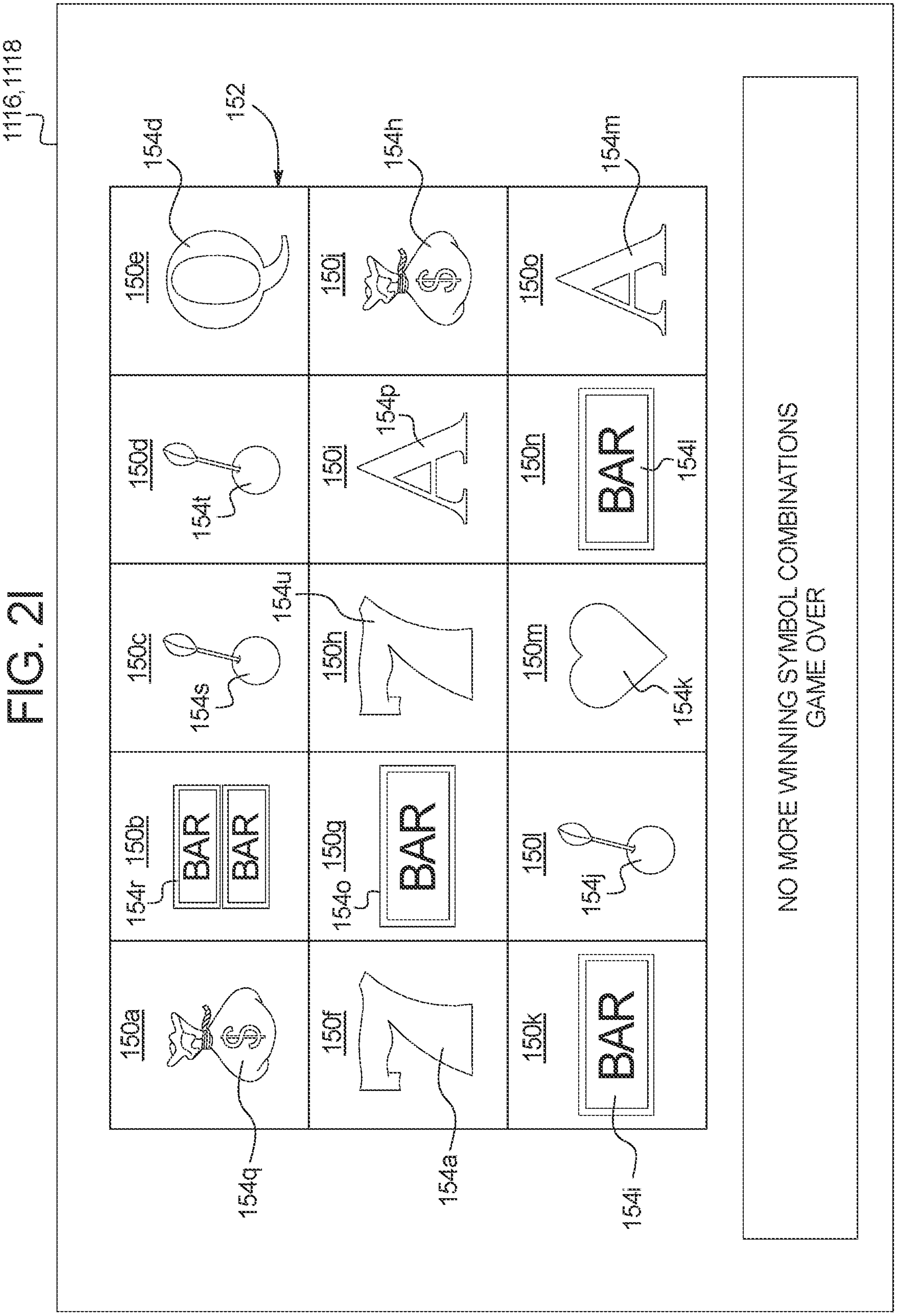

As seen in FIGS. 2H, following the creation of empty symbol display positions 150*a*, 150*c*, 150*g*, 150*h* and 150*i*, the gaming system shifts single bar symbol 154*o* and ace symbol 154*p* into symbol display positions 150*g* and 150*i*, respectively, of the second or middle row of the symbol display position matrix. Such shifting creates empty symbol display positions 150*b* and 150*d*.

As seen in FIG. 21, following the shifting of a plurality of the remaining symbols, the gaming system generates money bag symbol 154*q*, double bar symbol 154*r*, cherry symbol 154*s*, orange symbol 154*t* and seven symbol 154*u*, and displays these symbols at symbol display positions 150*a*, 150*b*, 150*c*, 150*d*, and 150*h* respectively, of the symbol display position matrix.

As further seen in FIG. 21, since none of the currently generated symbols form any winning symbol combinations associated with any awards, the gaming system terminates the play of the cascading symbols game and awaits another placement of another wager. In this example, the gaming system provides appropriate messages such as "NO MORE WINNING SYMBOL COMBINATIONS" and "GAME OVER" to the player visually, or through suitable audio or audiovisual displays.

In another embodiment, as illustrated in the above-described example, one or more of the symbols of one or more multiple symbol display position elements are wild symbols. In different embodiments, for each generation, removal and/or shifting associated with that wild symbol, the gaming system accumulates one or more modifiers, such as multipliers, for the player. In another embodiment, one or more of the symbols of one or more multiple symbol display position elements are modifier symbols, such as multipliers. In different embodiments, for each generation, removal and/or shifting associated with that modifier symbol, the gaming system modifies a value of that modifier symbol. In another embodiment, one or more of the symbols of one or more multiple symbol display position elements are wild modifier symbols, such as wild multipliers. In different embodiments, for each generation, removal and/or shifting associated with that wild modifier symbol, the gaming system modifies a value of that wild modifier symbol.

In another embodiment, the gaming system generates a multiple symbol display position element wherein one or more of the symbols of the generated multiple symbol display position element are included in a symbol display position and one or more of the symbols of the generated multiple symbol display position element are not included in any symbol display position (i.e., the generated multiple symbol display position element is partially in the symbol display position matrix and partially out of the symbol display position matrix). In one embodiment, the gaming system is configured such that the symbols of a multiple symbol display position element may be partially out of the symbol display position matrix at the top row of the symbol display position matrix, but not partially out of the symbol display position matrix at the bottom row of the symbol display position matrix. Such a configuration increases the probability of multiple symbol display position elements being generated in a designated game area.

In one embodiment utilizing partially displayed multiple symbol display position elements, the removal qualification condition is satisfied for a generated multiple symbol display position element if each of the displayed symbols of the multiple symbol display position element are included in different winning symbol combinations. In another such embodiment, the gaming system activates any attributes or features associated with the generated multiple symbol display position element and/or any attributes or features associated with the symbols of the generated multiple symbol display position element if each of the symbols of the generated multiple symbol display position element are displayed at symbol display positions of a symbol display position matrix.

In another embodiment, the gaming system utilizes a plurality of different sets of symbol display position grids. In one such embodiment, at least a first area, column or row of a first set of symbol display position grids is associated with or linked to at least a first area, column or row of a second set of symbol display position grids and at least a second area, column or row of the first set of symbol display position grids is not associated with or linked to any area, column or row in any second set of symbol display position grids. In a play of the game, as described above, symbols are independently generated for each set of symbol display position grids and the symbols displayed for each set of symbol display position grids are independently evaluated to provide any awards for any winning symbols or winning symbol combinations. After the evaluation, the gaming system removes zero, one, or more symbols to leave zero, one, or more empty symbol display positions. In one embodiment, if any empty symbol display positions are formed on the first area, column or row of the first set of symbol display position grids, the gaming system shifts or transfers one or more symbols from the first area, column or row of the first set of symbol display position grids to the linked first area, column or row of the second set of symbol display position grids to occupy the one or more empty symbol display positions. In this embodiment, if there are any empty symbol display positions on the second area, column or row of the first set of symbol display position grids, the gaming system does not shift or transfer any symbols from the second area, column or row of the first set of symbol display position grids to the second area, column or row of the second set of symbol display position grids. The gaming system then independently evaluates the symbols displayed for each set of symbol display position grids to provide any awards for any winning symbols or winning symbol combinations.

In one embodiment utilizing a plurality of different sets of symbol display position grids, the gaming system shifts or slides one or more symbols and one or more multiple symbol display position elements from symbol display position to symbol display position in the same symbol display position grid and in different symbol display position grids. In another embodiment utilizing a plurality of different sets of symbol display position grids, the gaming system shifts or slides one or more symbols and one or more multiple symbol display position elements from symbol display position to symbol display position in the same symbol display position grid, and the gaming system shifts or slides symbols from symbol display position to symbol display position in different symbol display position grids. In another embodiment utilizing a plurality of different sets of symbol display position grids, the gaming system shifts or slides one or more symbols and one or more multiple symbol display position elements from symbol display position to symbol display position in the same symbol display position grid, and the gaming system shifts or slides multiple symbol display position elements from symbol display position to symbol display position in different symbol display position grids.

In another embodiment which utilizes a plurality of symbol display position grids, the gaming system actives any attributes or features associated with a generated multiple symbol display position element if each of the symbols of the generated multiple symbol display position element have shifted from one symbol display position grid to another symbol display position grid. In another embodiment which utilizes a plurality of symbol display position grids, the gaming system actives any attributes or features associated with a symbol of a generated multiple symbol display position element if that symbol of the generated multiple symbol display position element has shifted from one symbol display position grid to another symbol display position grid.

In another embodiment, one or more multiple symbol display position elements are associated with an indicated quantity, such as a numeral indicated in parentheses next to that multiple symbol display position element. In this embodiment, each time a removal qualification condition is satisfied for a multiple symbol display position element, the indicated quantity of that multiple symbol display position element is modified. If the modified quantity is greater than a predefined quantity, such as zero, that multiple symbol display position element remains (i.e., the multiple symbol display position element is not removed despite the satisfaction of the removal qualification condition). On the other hand, if the modified quantity of the multiple symbol display position element is equal to or less than the predefined quantity, then that multiple symbol display position element is removed as described above. It should be appreciated that the utilization of indicated quantities of such multiple symbol display position element operates similar to the utilization of the wild symbols useable for a designated quantity of symbol generations as described in U.S. Published Patent Application No. 2010/0022297.

In one embodiment, as described above, the gaming system causes zero, one or more symbols and/or one or more multiple symbol display position elements to tumble and/or shift downward (or upward, or sideways or diagonally or any suitable direction) to fill one or more empty symbol display positions. In another embodiment, the gaming system utilizes different directions of movement for different symbol movements and/or multiple symbol display position element movements in association with a play of the cascading symbols game. In one such embodiment, the gaming system causes the initial generation of any symbols and any multiple symbol display position elements to shift downwards wherein if any empty symbol display positions are subsequently created, the gaming system causes zero, one or more remaining symbols and/or multiple symbol display position elements to shift sideways.

In certain embodiments, as described above, for a generated multiple symbol display position element to be removed from the symbol display matrix, each of the individual symbols of the multiple symbol display position element must individually qualify to be removed from the symbol display matrix. In another embodiment, for a generated multiple symbol display position element to be removed from the symbol display matrix, more than one but less than all of the individual symbols of the multiple symbol display position element must individually qualify to be removed from the symbol display matrix. For example, if a generated multiple symbol display position element includes three individual symbols, the gaming system removes each of the individual symbols of the multiple symbol display position element if two of the three symbols individually qualify to be removed from the symbol display matrix.

In another embodiment, the gaming system enables a player to designate one or more of the symbols and/or one or more of the multiple symbol display position elements to hold wherein the gaming system removes any non-player designated symbols and/or any non-player designated multiple symbol display position elements in association with the next shifting of symbols. In this embodiment, the gaming system enables a player to hold one or more symbols and/or multiple symbol display position elements wherein one or more non-held symbols and/or non-held multiple symbol display position elements are subsequently removed from the symbol display position grid. In one such embodiment, the gaming system implements this feature based on the placement of a wager, such as a side wager or a maximum wager.

In another embodiment which includes one or more player inputs, the gaming system enables a player to designate one or more symbols and/or one or more multiple symbol display position elements wherein the gaming system removes any player designated symbols and/or player designated multiple symbol display position elements in association with the next shifting of symbols. In this embodiment, the gaming system enables a player to discard one or more symbols and/or one or more multiple symbol display position elements wherein one or more non-discarded symbols and/or one or more non-discarded multiple symbol display position elements are held at one or more symbol display positions within the symbol display position grid. In one such embodiment, the gaming system implements this feature based on the placement of a wager, such as a side wager or a maximum wager.

In another embodiment, the gaming system disclosed herein utilizes the fourth dimension of time to determine any awards to be provided to a player. In one such embodiment, the gaming system associates certain multiple symbol display position elements with a duration until such multiple symbol display position elements shift symbol display positions. In another such embodiment, the gaming system associates certain multiple symbol display position elements with a duration which those symbols remain in a symbol display position grid. In this embodiment, if a multiple symbol display position element is generated in a plurality of symbol display positions and the removal qualification condition is satisfied in association with that multiple symbol display position element (e.g., each of the symbols of the multiple symbol display position element form part of a winning symbol combination), then as long as the associated duration has not expired, the multiple symbol display position element is not removed from the symbol display positions of the symbol display position grid. In one such embodiment, if a multiple symbol display position element remain in a symbol display position grid for a designated duration, the gaming system triggers one or more secondary games.

In another embodiment, one or more symbols of a multiple symbol display position element are associated with an award, such as a value, a modifier (e.g., a multiplier), a wild modifier, or a quantity of free spins. In one such embodiment, the gaming system provides an award to a player based on the awards associated with the displayed symbols of the generated multiple symbol display position elements. In one such embodiment, the gaming system individually provides the player an award for each individual symbol of a generated multiple symbol display position element (e.g., the gaming system separately increments a multiplier amount associated with each wild symbol of a generated multiple symbol display position element). In another such embodiment, the gaming system provides an award to a player based on the awards associated with the displayed symbols of the generated multiple symbol display position elements included in a winning symbol combination. In another such embodiment, if a secondary game triggering event occurs, the gaming system triggers a play of a secondary game with one or more features of the secondary game are based on the awards associated with the displayed symbols of the generated multiple symbol display position elements.

In another embodiment, the gaming system maintains one or more multiple symbol display position elements in the symbol display position matrix (i.e., the gaming system does not remove such multiple symbol display position elements despite a removal qualification condition being satisfied in associated with the multiple symbol display position element). In one such embodiment, one or more attributes or features associated with one or more symbols of the multiple symbol display position element are modified (e.g., increase) each time each of the symbols of the multiple symbol display position element are involved in a winning symbol combination. For example, if the symbols of a multiple symbol display position element are wild multiplier symbols, each time the symbols of the multiple symbol display position element are each involved in a winning symbol combination, the gaming system increases the multiplier value of the wild symbols of the multiple symbol display position element.

In another embodiment which includes associating the individual symbols of the multiple symbol display position element with one or more awards, the gaming system modifies such awards. In one such embodiment, the gaming system modifies, such as increases, the awards associated with symbols of one or more multiple symbol display position elements with one or more movements of that multiple symbol display position element.

In another embodiment, one or more symbols of one or more multiple symbol display position elements are associated with a positive outcome and one or more symbols of one or more multiple symbol display position elements are associated with a negative outcome. In this embodiment, which may be employed in association with a tumbling symbol game (as described above) or in association with a non-tumbling symbol game, the gaming system determines any awards to provide based on the quantity and type of symbols associated with positive outcomes compared to the quantity and type of symbols associated with negative outcomes. In one such embodiment, one or more outcomes associated with one or more symbols of one or more multiple symbol display position elements are associated with an attribute, such as a relative weighting of that outcome.

In another embodiment, the symbol display positions form a plurality of symbol display position matrices or grids. In this embodiment, each symbol display position grid includes a plurality of symbol display positions arranged in a plurality of rows and a plurality of columns. Additionally, in this embodiment, each symbol display position grid also has a different depth. Thus, each symbol display position of each symbol display position grid is associated with a specific row, a specific column and a specific depth. Moreover, in each symbol display position grid of this embodiment, one or more symbol display positions are aligned with or otherwise correspond with one or more symbol display positions of one or more symbol display position grids of different depths. That is, one or more symbol display position grids are positioned (relative to the player's line of sight) behind one or more other symbol display position grids and thus one or more symbol display positions of one or more symbol display position grids are positioned (relative to the player's line of sight) behind one or more symbol display positions of one or more other symbol display position grids. It should be appreciated that in one embodiment which utilizes a plurality of symbol display position grids, the creation of one or more empty symbol display positions at one symbol display position grid causes the exposure of symbols generated at symbol display positions of another grid positioned at another depth.

In one embodiment, one or more of the generated symbols and/or one or more of the generated multiple symbol display position elements include a length component and a width component, such as a two dimensional tile with a symbol displayed on the face of the tile. In one such embodiment which employs a single symbol display position grid, the gaming system generates and displays a symbol and/or a multiple symbol display position element in each of the plurality of symbol display positions of the single symbol display position grid. In another such embodiment which employs a plurality of symbol display position grids of different depths, the gaming system generates and displays a symbol and/or a multiple symbol display position element in each of the plurality of symbol display positions of each of the plurality of symbol display position grids.

In another embodiment, one or more of the generated symbols are multiple dimension symbols including a length component, a width component and a depth component. In another embodiment, one or more of the generated multiple symbol display position elements are additionally or alternatively multiple dimension multiple symbol display position elements including a length component, a width component and a depth component. For example, one or more multiple dimension symbols and/or one or more multiple symbol display position elements each include a six-sided or hexagonal shape with individually displayed symbols on each side or face of the multi-dimensional shape. In another example, one or more multiple dimension symbols and/or one or more multiple symbol display position elements each include a four-sided square or rectangular shape with individually displayed symbols on each side or face. In another example, one or more multiple dimension symbols and/or one or more multiple symbol display position elements each include a three-sided or triangular shape with individually displayed symbols on each side or face. In an alternative embodiment, one or more faces or sides of one or more multiple dimension symbols and/or multiple symbol display position elements do not include an individually displayed symbol. It should be appreciated that such multiple dimension symbols can include any suitable number of sides and any suitable number of individually displayed symbols per side.

In one such embodiment which employs a single symbol display position grid, multiple dimension symbols and multiple dimension multiple symbol display position elements, the gaming system generates and displays a multiple dimension symbol and/or a multiple symbol display position element in each of the plurality of symbol display positions of the single symbol display position grid. In another such embodiment which employs a plurality of symbol display position grids of different depths, multiple dimension symbols and multiple dimension multiple symbol display position elements, the gaming system generates and displays a multiple dimension symbol and/or a multiple symbol display position element in each of the plurality of symbol display positions of each of the plurality of symbol display position grids.

In the embodiments which include a plurality of symbol display position grids, a plurality of multiple dimension symbols and/or a plurality of multiple dimension multiple symbol display position elements, one or more paylines of any suitable direction extend through a plurality of symbol display positions, one or more symbols displayed on one or more faces of one or more multiple dimension symbols and/or one or more symbols of one or more multiple symbol display position elements of a symbol display position grid at one depth. In another embodiment, one or more paylines of any suitable direction extend through a plurality of symbol display positions, one or more symbols displayed on one or more faces of one or more multiple dimension symbols and/or one or more symbols of one or more multiple symbol display position elements of a plurality of symbol display position grids at a plurality of different depths. In these embodiments, the gaming system determines whether the symbols generated along such paylines form any winning symbol combinations. In different embodiments, one or more ways to win, scatter pays and/or connection pays are associated with a plurality of symbol display positions, one or more symbols displayed on one or more faces of one or more multiple dimension symbols and/or one or more symbols of one or more multiple symbol display position elements of one or more symbol display position grids at one depth. In different embodiments, one or more ways to win, scatter pays and/or connection pays are associated with a plurality of symbol display positions, one or more symbols displayed on one or more faces of one or more multiple dimension symbols and/or one or more symbols of one or more multiple symbol display position elements of a plurality of symbol display position grids at a plurality of different depths. In these embodiments, the gaming system determines whether the symbols generated in a quantity of active symbol display positions form any winning symbol combinations.

It should be appreciated that in one embodiment which utilizes a plurality of symbol display position grids, when determining if any awards are associated with the currently displayed symbols, the gaming system may evaluate symbols displayed at a plurality of symbol display positions of a plurality of symbol display position grids of a plurality of different depths. That is, since the gaming system of this embodiment only evaluates the symbols that are currently displayed to the player and different symbols positioned at different depths may be currently displayed to the player (due to the removal and/or shifting of symbols positioned in front of these symbols), the gaming system is configured to evaluate symbols displayed at different depths to determine any additional awards to provide to the player. Such a configuration provides the player with additional opportunities to win awards in association with a plurality of grids of symbol display positions.

In different embodiments, the awards associated with one or more symbols or winning symbol combinations include one or more of: a quantity of monetary credits, a quantity of non-monetary credits, a quantity of promotional credits, a quantity of player tracking points, a progressive award, a modifier, such as a multiplier, a quantity of free plays of one or more games, a quantity of plays of one or more secondary or bonus games, a multiplier of a quantity of free plays of a game, one or more lottery based awards, such as lottery or drawing tickets, a wager match for one or more plays of one or more games, an increase in the average expected payback percentage for one or more plays of one or more games, one or more comps, such as a free dinner, a free night's stay at a hotel, a high value product such as a free car, or a low value product such as a free teddy bear, one or more bonus credits usable for online play, a lump sum of player tracking points or credits, a multiplier for player tracking points or credits, an increase in a membership or player tracking level, one or more coupons or promotions usable within and/or outside of the gaming establishment (e.g., a 20% off coupon for use at a convenience store), virtual goods associated with the gaming system, virtual goods not associated with the gaming system, an access code usable to unlock content on an internet.

In one embodiment, the gaming system causes at least one display device of at least one electronic gaming machine to display the cascading symbol game. In another embodiment, in addition or in alternative to each electronic gaming machine displaying the cascading symbol game, the gaming system causes one or more community or overhead display devices to display part or all of the cascading symbol game to one or more other players or bystanders either at a gaming establishment or viewing over a network, such as the internet. In another embodiment, in addition or in alternative to each electronic gaming machine displaying the cascading symbol game, the gaming system causes one or more internet sites to each display the cascading symbol game such that a player is enabled to log on from a personal web browser. In another such embodiment, the gaming system enables the player to play one or more games on one device while viewing the cascading symbol game from another device, such as a desktop or laptop computer.

In one embodiment, as described above, a cascading symbol game is a primary or base wagering game. In this embodiment, upon a placement of a wager by a player, the gaming system triggers a play of the cascading symbol game.

In another embodiment, the cascading symbol game is a secondary or bonus game which is triggered in response to an occurrence of a cascading symbol game triggering event. In one such embodiment, a cascading symbol game triggering event occurs, based on an outcome associated with one or more plays of any primary game and/or an outcome associated with one or more plays of any secondary game of the gaming devices in the gaming system. In one embodiment, such determinations are symbol driven based on the generation of one or more designated symbols or symbol combinations. In various embodiments, a generation of a designated symbol (or sub-symbol) or a designated set of symbols (or sub-symbols) over one or more plays of a primary game causes a cascading symbol game triggering event to occur.

In another embodiment, the gaming system does not provide any apparent reasons to the players for a cascading symbol game triggering event to occur. In these embodiments, such determinations are not triggered by an event in a primary game or based specifically on any of the plays of any primary game or on any of the plays of any secondary game of the gaming devices in the system. That is, these events occur without any explanation or alternatively with simple explanations.

In one such embodiment, a cascading symbol game triggering event occurs based on an amount of coin-in. In this embodiment, the gaming system determines if an amount of coin-in wagered reaches or exceeds a designated amount of coin-in (i.e., a threshold coin-in amount). Upon the amount of coin-in wagered reaching or exceeding the threshold coin-in amount, the gaming system causes one or more of such events or conditions to occur. In another such embodiment, a cascading symbol game triggering event occurs based on an amount of virtual currency-in. In this embodiment, the gaming system determines if an amount of virtual currency-in wagered reaches or exceeds a designated amount of virtual currency-in (i.e., a threshold virtual currency-in amount). Upon the amount of virtual currency-in wagered reaching or exceeding the threshold virtual currency-in amount, the gaming system causes one or more of such events or conditions to occur. In different embodiments, the threshold coin-in amount and/or the threshold virtual currency-in amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In one such embodiment, a cascading symbol game triggering event occurs based on an amount of coin-out. In this embodiment, the gaming system determines if an amount of coin-out reaches or exceeds a designated amount of coin-out (i.e., a threshold coin-out amount). Upon the amount of coin-out reaching or exceeding the threshold coin-out amount, the gaming system causes one or more of such events or conditions to occur. In another such embodiment, a cascading symbol game triggering event occurs based on an amount of virtual currency-out. In this embodiment, the gaming system determines if an amount of virtual currency-out reaches or exceeds a designated amount of virtual currency-out (i.e., a threshold virtual currency-out amount). Upon the amount of virtual currency-out reaching or exceeding the threshold virtual currency-out amount, the gaming system causes one or more of such events or conditions to occur. In different embodiments, the threshold coin-out amount and/or the threshold virtual currency-out amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In another alternative embodiment, a cascading symbol game triggering event occurs, based on a predefined variable reaching a defined parameter threshold. For example, when the $500{,}000^{th}$ player has played a gaming device of the gaming system (ascertained from a player tracking system), one or more of such events or conditions occur. In different embodiments, the predefined parameter thresholds include a length of time, a length of time after a certain dollar amount is hit, a wager level threshold for a specific device (which gaming device is the first to contribute $250,000), a number of gaming devices active, or any other parameter that defines a suitable threshold.

In another alternative embodiment, a cascading symbol game triggering event occurs, based on a quantity of games played. In this embodiment, a quantity of games played is set for when one or more of such events or conditions will occur. In one embodiment, such a set quantity of games played is based on historic data.

In another alternative embodiment, a cascading symbol game triggering event occurs, based on time. In this embodiment, a time is set for when one or more of such events or conditions will occur. In one embodiment, such a set time is based on historic data.

In another alternative embodiment, a cascading symbol game triggering event occurs, based upon gaming system operator defined player eligibility parameters stored on a player tracking system (such as via a player tracking card or other suitable manner). In this embodiment, the parameters for eligibility are defined by the gaming system operator based on any suitable criterion. In one embodiment, the gaming system recognizes the player's identification (via the player tracking system) when the player inserts or otherwise associates their player tracking card in the gaming device. The gaming system determines the player tracking level of the player and if the current player tracking level defined by the gaming system operator is eligible for one or more of such events or conditions. In one embodiment, the gaming system operator defines minimum bet levels required for such events or conditions to occur based on the player's card level.

In another alternative embodiment, a cascading symbol game triggering event occurs, based on a system determination, including one or more random selections by the central controller. In one embodiment, as described above, the central controller tracks all active gaming devices and the wagers they placed. In one such embodiment, based on the gaming device's state as well as one or more wager pools associated with the gaming device, the central controller determines whether to one or more of such events or conditions will occur. In one such embodiment, the player who consistently places a higher wager is more likely to be associated with an occurrence of one or more of such events or conditions than a player who consistently places a minimum wager. It should be appreciated that the criteria for determining whether a player is in active status or inactive status for determining if one or more of such events occur may the same as, substantially the same as, or different than the criteria for determining whether a player is in active status or inactive status for another one of such events to occur.

In another alternative embodiment, a cascading symbol game triggering event occurs, based on a determination of if any numbers allotted to a gaming device match a randomly selected number. In this embodiment, upon or prior to each play of each gaming device, a gaming device selects a random number from a range of numbers and during each primary game, the gaming device allocates the first N numbers in the range, where N is the number of credits bet by the player in that primary game. At the end of the primary game, the randomly selected number is compared with the numbers allocated to the player and if a match occurs, one or more of such events or conditions occur. It should be appreciated that any suitable manner of causing a cascading symbol game triggering event to occur may be implemented in accordance with the gaming system and method disclosed herein.

It should be appreciated that any of the above-described cascading symbol game triggering events may be combined in one or more different embodiments.

It should be further appreciated that any of the embodiments disclosed herein may be implemented in a non-tumbling reels configuration. That is, after removing zero, one or more generated symbols and zero, one or more multiple symbol display position elements, the gaming system does not proceed to shift zero, one or more symbols and/or zero, one or more multiple symbol display position elements to fill zero, one or more empty symbol displays. Rather, the gaming system generates zero, one or more symbols and/or zero, one or more multiple symbol display position elements in any created empty symbol display position and proceeds with evaluating such symbols to determine any awards.

Alternative Embodiments

It should be appreciated that in different embodiments, one or more of:

i. a shape or configuration of each symbol display position grid;

ii. a quantity of rows in each symbol display position grid;

iii. a quantity of columns in each symbol display position grid;

iv. a quantity of symbols of or otherwise associated with one or more multiple symbol display position elements (i.e., a size of one or more multiple symbol display position elements);

v. a quantity of symbols generated;

vi. a quantity of multiple symbol display position elements generated;

vii. which symbols and/or multiple symbol display position elements are shifted;

viii. which symbols and/or multiple symbol display position elements retain their original positioning;

ix. a determination of if one or more symbols will be removed;

x. which symbol combinations are winning symbol combinations;

xi. which awards are associated with which winning symbol combinations;

xii. which symbols are removed from which symbol display position grids;

xiii. a determination of if one or more multiple symbol display position element will be removed (i.e., will a removal qualification condition be satisfied);

xiv. which multiple symbol display position elements are removed from which symbol display position grids;

xv. a quantity of symbol display position grids;

xvi. a quantity of symbol display positions in each symbol display position grid;

xvii. a quantity of symbols and/or multiple symbol display position elements removed from any symbol display position grids;

xviii. the direction of any shifting of any symbols and/or any multiple symbol display position elements;

xix. which symbols and/or multiple symbol display position elements are available to be generated in each symbol display position grid;

xx. a duration of time a symbol and/or a multiple symbol display position element will remain at one of the symbol display positions;

xxi. a quantity of winning symbols combinations which a symbol will remain at one of the symbol display positions;

xxii. a quantity of satisfactions of the removal qualification condition which a multiple symbol display position element will remain at the same plurality of the symbol display positions;

xxiii. a quantity of symbol shifts a symbol will remain at one of the symbol display positions;

xxiv. a quantity of shifts a multiple symbol display position element will remain at the same plurality of symbol display positions;

xxv. a quantity of games played in which a symbol will remain at one of the symbol display positions;

xxvi. a quantity of games played in which a multiple symbol display position element will remain at the same plurality of symbol display positions;

xxvii. a determination of whether to enable a player to make any inputs to hold any symbols and/or any multiple symbol display position elements;

xxviii. a determination of whether to enable a player to make any inputs to discard any symbols and/or any multiple symbol display position elements; and/or xxix. any determination disclosed herein;

is/are predetermined, randomly determined, randomly determined based on one or more weighted percentages, determined based on a generated symbol or symbol combination, determined independent of a generated symbol or symbol combination, determined based on a random determination by the central controller, determined independent of a random determination by the central controller, determined based on a random determination at the gaming system, determined independent of a random determination at the gaming system, determined based on at least one play of at least one game, determined independent of at least one play of at least one game, determined based on a player's selection, determined independent of a player's selection, determined based on one or more side wagers placed, determined independent of one or more side wagers placed, determined based on the player's primary game wager, determined independent of the player's primary game wager, determined based on time (such as the time of day), determined independent of time (such as the time of day), determined based on an amount of coin-in accumulated in one or more pools, determined independent of an amount of coin-in accumulated in one or more pools, determined based on a status of the player (i.e., a player tracking status), determined independent of a status of the player (i.e., a player tracking status), determined based on one or more other determinations disclosed herein, determined independent of any other determination disclosed herein or determined based on any other suitable method or criteria.

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more electronic gaming machines ("EGMs"); and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred herein as an "EGM." Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

Figure 3A:
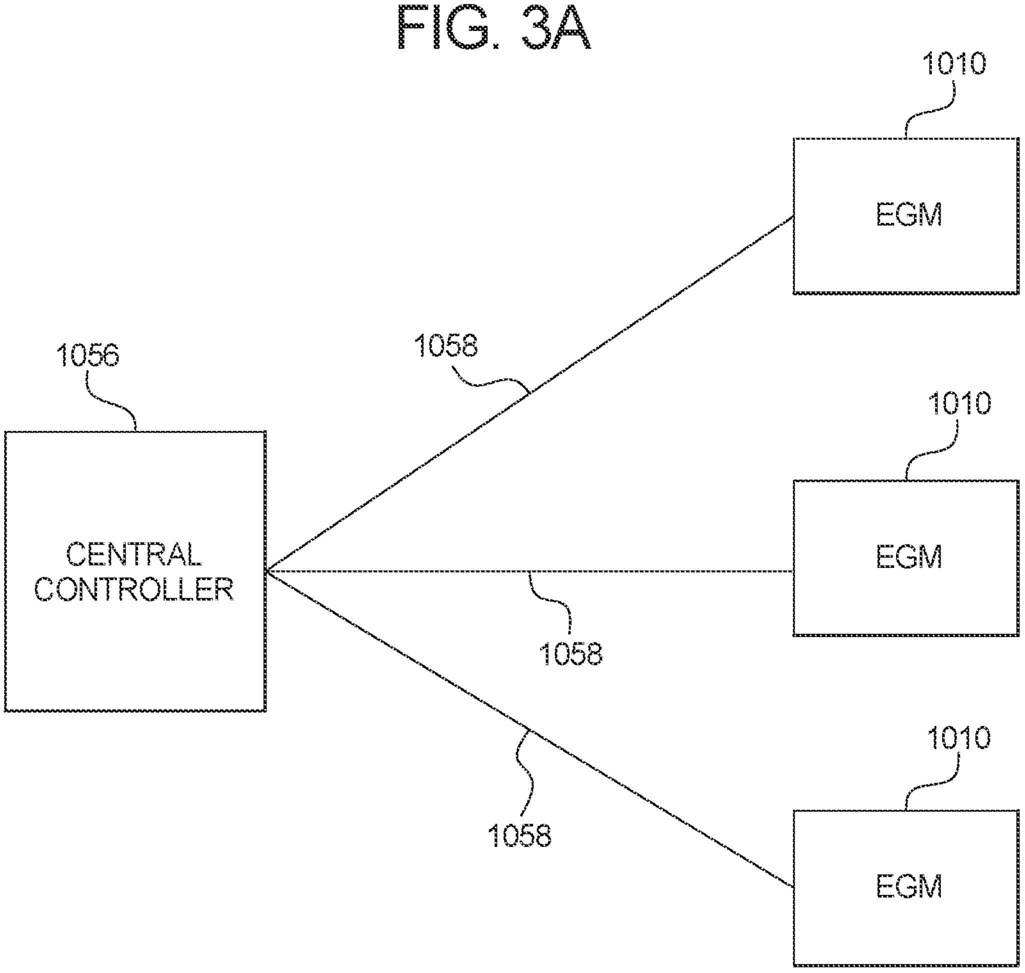
FIG. 3A is a schematic block diagram of one embodiment of a network configuration of the gaming system disclosed herein.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 3A includes a plurality of EGMs 1010 that are each configured to communicate with a central server, central controller, or remote host 1056 through a data network 1058.

In certain embodiments in which the gaming system includes an EGM in combination with a central server, central controller, or remote host, the central server, central controller, or remote host is any suitable computing device (such as a server) that includes at least one processor and at least one memory device or storage device. As further described herein, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central server, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 3B:
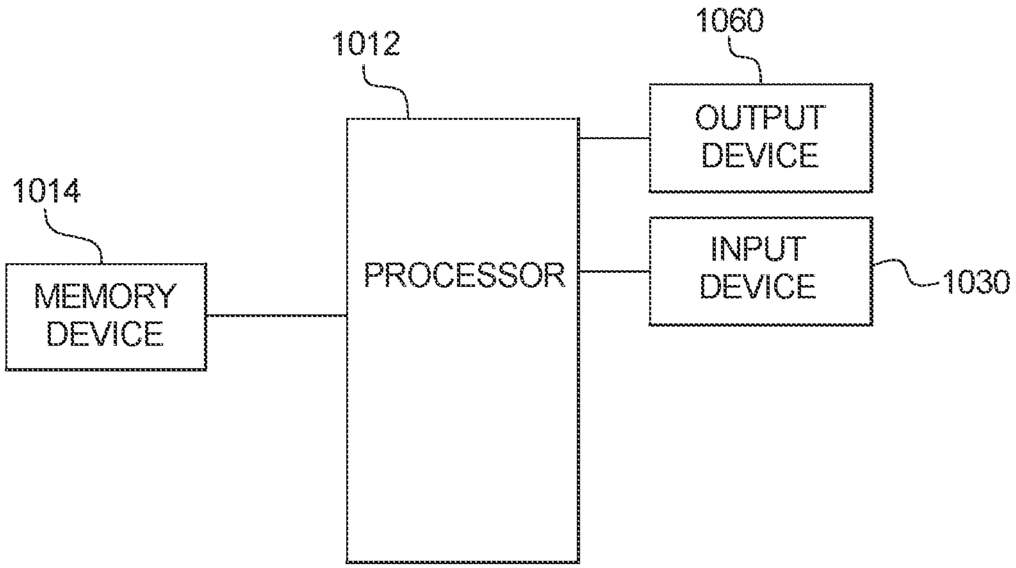
FIG. 3B is a schematic block diagram of one embodiment of an electronic configuration of the gaming system disclosed herein.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 3B illustrates an example EGM including a processor 1012.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 3B includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

Figure 4A:
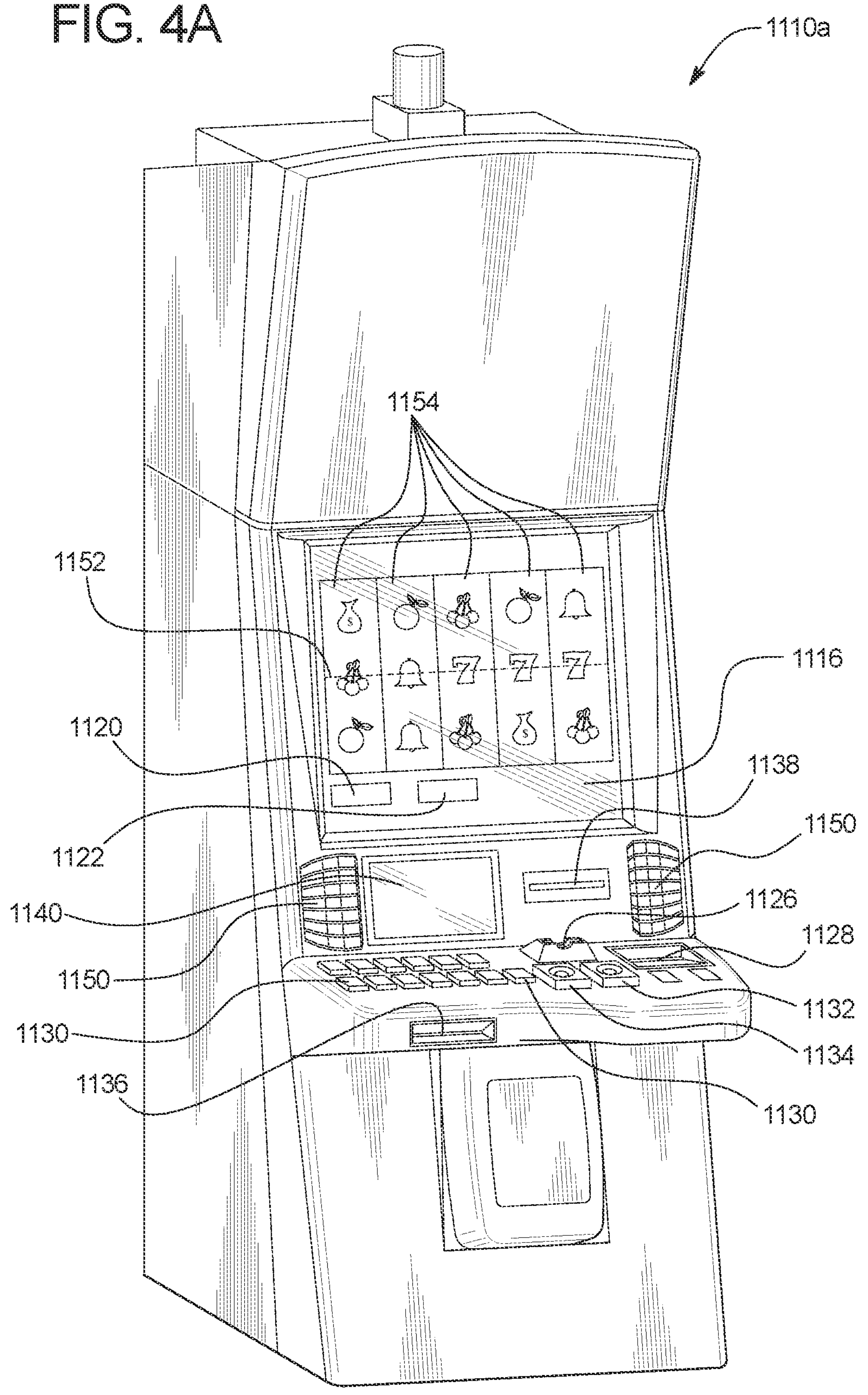
FIGS. 4A and 4B are perspective views of example alternative embodiments of the gaming system disclosed herein.
Figure 4B:
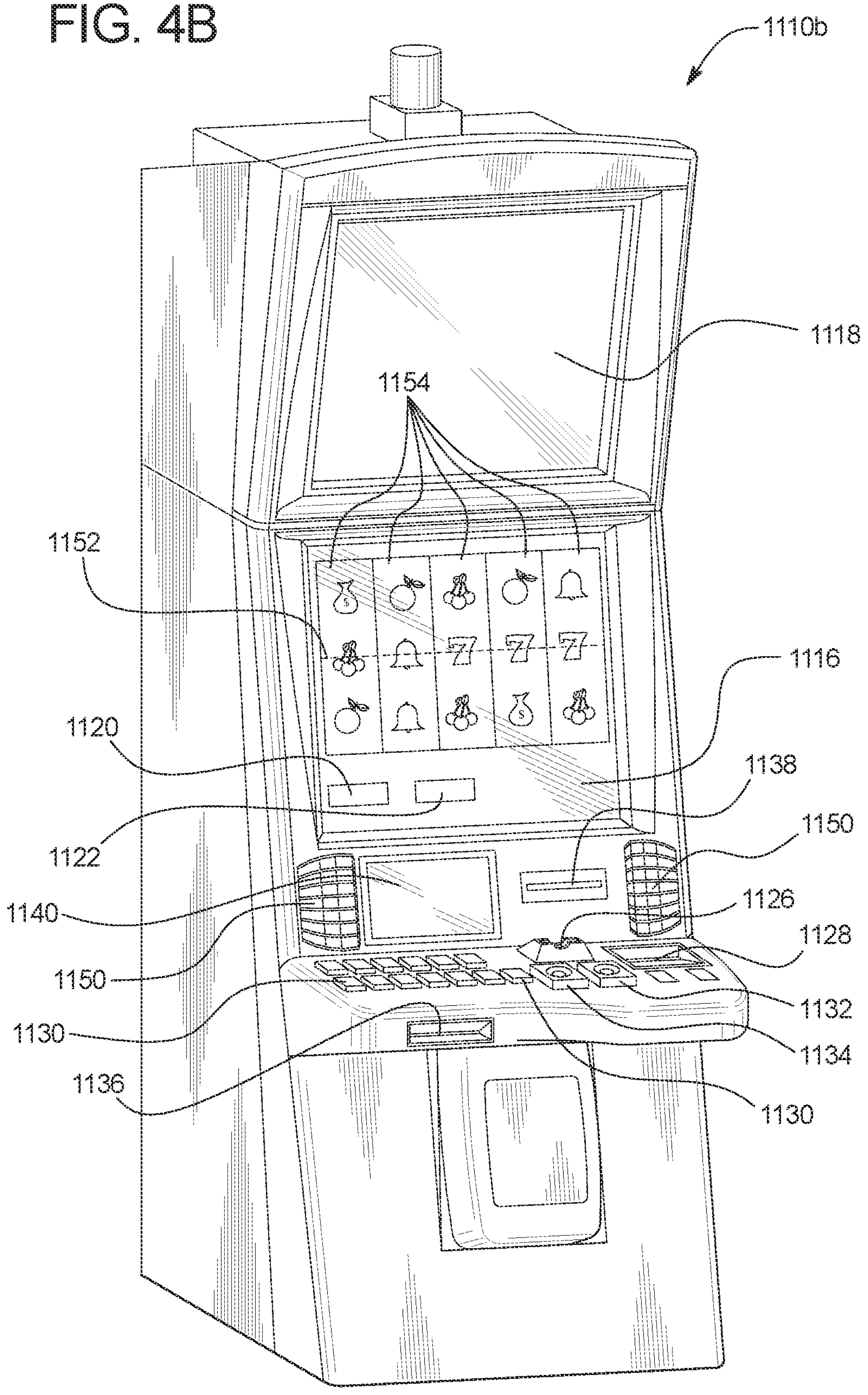

In various embodiments, the EGM includes one or more input devices. The input devices may include any suitable device that enables an input signal to be produced and received by the at least one processor of the EGM. The example EGM illustrated in FIG. 3B includes at least one input device 1030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 4A and 4B illustrate example EGMs that each include the following payment devices: (a) a combined bill and ticket acceptor 1128, and (b) a coin slot 1126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 4A and 4B each include a game play activation device in the form of a game play initiation button 32. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one. It should be appreciated that while the player's credit balance, the player's wager, and any awards are displayed as an amount of monetary credits or currency in the embodiments described herein, one or more of such player's credit balance, such player's wager, and any awards provided to such player may be for non-monetary credits, promotional credits, and/or player tracking points or credits.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 4A and 4B each include a cash out device in the form of a cash out button 1134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 4A and 4B each include a card reader 1138. The card reader is configured to read a player identification card inserted into the card reader.

In various embodiments, the EGM includes one or more output devices. The example EGM illustrated in FIG. 3B includes at least one output device 1060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 4A includes a central display device 1116, a player tracking display 1140, a credit display 1120, and a bet display 1122. The example EGM illustrated in FIG. 4B includes a central display device 1116, an upper display device 1118, a player tracking display 1140, a player tracking display 1140, a credit display 1120, and a bet display 1122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 4A and 4B each include ticket generator 1136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 4A and 4B each include a plurality of speakers 1150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs illustrated in FIGS. 4A and 4B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 4A and 4B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281561 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGMs shown in FIGS. 4A and 4B each include a payline 1152 and a plurality of reels 1156. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display positions on a requisite number of adjacent reels. In one such embodiment, one or more paylines are formed between at least two symbol display positions that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display positions, the gaming system enables a wager to be placed on a plurality of symbol display positions, which activates those symbol display positions.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display positions on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables a prize or payout in to be obtained addition to any prize or payout obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a “BONUS” symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of operating a gaming system, the method comprising:

displaying, by a display device, a plurality of symbols at a plurality of symbol display positions of a plurality of symbol display position matrices, wherein the plurality of symbols comprises a multiple symbol display position element comprising at least two of the symbols displayed at at least two of the symbol display positions, and in addition to any evaluation of the plurality of symbols displayed at the plurality of symbol display positions by a processor to determine if any winning symbol combinations are formed and responsive to the at least two of the symbols of the multiple symbol display position element being displayed at at least two of the symbol display positions of at least two of the symbol display position matrices and a condition occurring in association with each of the at least two of the symbols of the multiple symbol display position element:

determining a first award associated with the occurrence of the condition, and displaying, by the display device, the first award.

2. The method of claim 1, further comprising:

evaluating the symbols displayed at the symbol display positions to determine if any of the displayed symbols form any winning symbol combinations, wherein if any multiple symbol display position elements are displayed at least one symbol display position of the first one of the symbol display position matrices and at least one linked symbol display position of the second one of the symbol display position matrices, the at least one symbol associated with the multiple symbol display position element displayed at the at least one symbol display position of the first one of the symbol display position matrices is determined to form any winning symbol combinations with the other symbols of the first one of the symbol display position matrices and the at least one symbol associated with the multiple symbol display position element displayed at the at least one symbol display position of the second one of the symbol display position matrices is determined to form any winning symbol combinations with the other symbols of the second one of the symbol display position matrices, and for each of the symbol display position matrices, responsive to a plurality of the displayed symbols forming at least one winning symbol combination, displaying, by the display device, a second award associated with the formed winning symbol combination.

3. The method of claim 1, wherein the symbols of the multiple symbol display position elements comprise wild symbols.

4. The method of claim 1, further comprising:

determining whether each displayed symbol qualifies to be removed, wherein for each displayed multiple symbol display position element, said determination is based on if each of the symbols of said displayed multiple symbol display position element qualify to be removed, for each displayed symbol that qualifies to be removed, displaying, by the display device, a removal of that symbol, and displaying, by the display device, a repositioning of a quantity of any remaining displayed symbols.

5. The gaming system of claim 1, further comprising an acceptor, wherein when executed by the processor, the plurality of instructions cause the processor to: responsive to a physical item being received via the acceptor, modify a credit balance based, at least in part, on a monetary value associated with the received physical item, and responsive to a cashout input being received, cause an initiation of any payout associated with the credit balance.

6. The gaming system of claim 1, wherein the display device comprises part of a mobile device.

7. A method of operating a gaming system, the method comprising:

displaying, by a display device, a plurality of symbols at a plurality of symbol display positions, wherein the plurality of symbols comprises a multiple symbol display position element comprising at least two of the symbols displayed at at least two of the symbol display positions, evaluating, by a processor, the symbols displayed at the symbol display positions to determine if any winning symbol combinations are formed, wherein if the multiple symbol display position element is displayed, each of the at least two of the symbols of that multiple symbol display position element is separately evaluated, responsive to at least two of the displayed symbols forming a winning symbol combination, displaying, by the display device, a first award associated with that formed winning symbol combination, and in addition to evaluating, by the processor, the symbols displayed at the symbol display positions to determine if any winning symbol combinations are formed and responsive to a condition occurring in association with each of the at least two of the symbols of the multiple symbol display position element:

determining, by the processor, a second award associated with the occurrence of the condition, and displaying, by the display device, the second award.

8. The method of claim 7, wherein the symbols of the multiple symbol display position element comprise wild symbols.

9. The method of claim 7, wherein the plurality of symbol display positions comprise a first set of symbol display positions of a first symbol display position matrix and a second, different set of symbol display positions of a second, different symbol display position matrix.

10. The method of claim 7, further comprising:

determining, by the processor, whether each displayed symbol qualifies to be removed, wherein for each displayed multiple symbol display position element, said determination is based on if each of the symbols of said displayed multiple symbol display position element qualify to be removed, for each displayed symbol that qualifies to be removed, displaying, by the display device, a removal of that symbol, and displaying, by the display device, a repositioning of a quantity of any remaining displayed symbols.

11. The method of claim 10, further comprising, determining, by the processor and for each displayed symbol of each multiple symbol display position element, whether said symbol qualifies to be removed based on if said symbol is part of any formed winning symbol combinations.

12. The method of claim 10 further comprising an acceptor, wherein responsive to a physical item being received via the acceptor, modifying a credit balance based, at least in part, on a monetary value associated with the received physical item, and responsive to a cashout input being received, causing an initiation of any payout associated with the credit balance.

13. The method of claim 10 wherein the display device comprises part of a mobile device.

* * * * *